(12) United States Patent
Kamakura

(10) Patent No.: US 10,625,339 B2
(45) Date of Patent: Apr. 21, 2020

(54) THREE-DIMENSIONAL FORMING APPARATUS AND THREE-DIMENSIONAL FORMING METHOD

(71) Applicant: SEIKO EPSON CORPORATION, Tokyo (JP)

(72) Inventor: Tomoyuki Kamakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/458,896

(22) Filed: Jul. 1, 2019

(65) Prior Publication Data

US 2019/0344347 A1    Nov. 14, 2019

Related U.S. Application Data

(63) Continuation of application No. 15/183,585, filed on Jun. 15, 2016, now Pat. No. 10,376,957.

(30) Foreign Application Priority Data

Jun. 16, 2015   (JP) .................................. 2015-120869

(51) Int. Cl.
   *B29C 64/153*    (2017.01)
   *B22F 3/105*    (2006.01)
   (Continued)

(52) U.S. Cl.
   CPC .............. *B22F 3/1055* (2013.01); *B22F 7/06* (2013.01); *B29C 64/153* (2017.08); *B29C 64/20* (2017.08);
   (Continued)

(58) Field of Classification Search
   CPC ..... B29C 64/20; B29C 64/205; B29C 64/153; B22F 3/1055
   See application file for complete search history.

(56) References Cited

U.S. PATENT DOCUMENTS 5,134,569 A * 7/1992 Masters .................. B29C 35/08
                                                    700/182
5,833,914 A * 11/1998 Kawaguchi ............. B29C 67/06
                                                    264/400
(Continued)

FOREIGN PATENT DOCUMENTS

JP    08-156106    6/1996
JP    2000-144005    5/2000
(Continued)

OTHER PUBLICATIONS

European Search Report for Application No. 16173887.7 dated Oct. 28, 2016.
U.S. Appl. No. 15/183,585, Apr. 8, 2019, Notice of Allowance.

*Primary Examiner* — Timothy Kennedy
(74) *Attorney, Agent, or Firm* — Workman Nydegger

(57) ABSTRACT

A three-dimensional forming apparatus includes: a stage; a material supply mechanism that supplies a sinterable material in which metal powder and a binder are contained to a stage; an energy radiation mechanism that supplies energy capable of sintering the dry sinterable material; and a driving mechanism that is able to three-dimensionally move the material supply mechanism and the energy radiation mechanism relative to the stage. The material supply mechanism includes a material ejection unit supplying a predetermined amount of the sinterable material to the stage. The energy radiation mechanism includes an energy radiation unit outputting the energy. The material ejection unit and the energy radiation unit are held in one holding mechanism.

5 Claims, 14 Drawing Sheets

(51) Int. Cl.
*B33Y 10/00* (2015.01)
*B33Y 30/00* (2015.01)
*B29C 64/205* (2017.01)
*B29C 64/20* (2017.01)
*B22F 7/06* (2006.01)

(52) U.S. Cl.
CPC ............ *B29C 64/205* (2017.08); *B33Y 10/00* (2014.12); *B33Y 30/00* (2014.12); *B22F 2003/1056* (2013.01); *B22F 2003/1057* (2013.01); *Y02P 10/295* (2015.11)

(56) References Cited

U.S. PATENT DOCUMENTS

| | | | |
|---|---|---|---|
| 5,837,960 A * | 11/1998 | Lewis | B23K 26/34 219/121.63 |
| 5,993,554 A * | 11/1999 | Keicher | B23K 26/144 118/308 |
| 6,143,378 A * | 11/2000 | Harwell | C23C 26/02 427/597 |
| 6,405,095 B1 * | 6/2002 | Jang | G05B 19/4099 700/118 |
| 6,827,988 B2 | 12/2004 | Krause et al. | |
| 7,626,136 B2 | 12/2009 | Sato et al. | |
| 10,124,540 B2 | 11/2018 | Ooba et al. | |
| 2002/0104973 A1 * | 8/2002 | Kerekes | B22F 3/1055 250/559.2 |
| 2003/0001313 A1 | 1/2003 | Krause et al. | |
| 2006/0266740 A1 | 11/2006 | Sato et al. | |
| 2008/0182017 A1 * | 7/2008 | Singh | B22F 3/1055 427/142 |
| 2010/0080935 A1 * | 4/2010 | Brice | B22F 3/1055 427/597 |
| 2011/0109016 A1 | 5/2011 | Fuwa et al. | |
| 2012/0145683 A1 * | 6/2012 | Miyagi | B23K 26/147 219/121.64 |
| 2013/0270750 A1 * | 10/2013 | Green | B22F 3/1055 264/497 |
| 2014/0186549 A1 | 7/2014 | Miyagi et al. | |
| 2015/0108695 A1 * | 4/2015 | Okada | B29C 64/135 264/497 |
| 2015/0130118 A1 * | 5/2015 | Cheng | B22F 3/1055 264/497 |
| 2016/0221261 A1 | 8/2016 | Yamamoto et al. | |
| 2016/0243619 A1 * | 8/2016 | Gothait | C09D 11/30 |
| 2016/0311027 A1 * | 10/2016 | Shimoyama | B22F 3/1055 |
| 2016/0368224 A1 | 12/2016 | Ooba et al. | |
| 2017/0225393 A1 * | 8/2017 | Shkolnik | G02B 26/126 |
| 2017/0259504 A1 * | 9/2017 | Lin | B23K 26/12 |
| 2018/0022033 A1 * | 1/2018 | Fujita | B29C 64/393 425/162 |

FOREIGN PATENT DOCUMENTS

| | | |
|---|---|---|
| JP | 2003-048781 | 2/2003 |
| JP | 2005-219060 | 8/2005 |
| JP | 2008-184622 | 8/2008 |
| JP | 2008-184623 | 8/2008 |
| JP | 2013-075308 | 4/2013 |
| JP | 2015-009495 | 1/2015 |
| WO | 1997-038810 | 10/1997 |
| WO | 2005-084875 | 9/2005 |
| WO | 2005-089090 | 9/2005 |
| WO | 2015-049834 | 4/2015 |
| WO | 2015-056230 | 4/2015 |

* cited by examiner

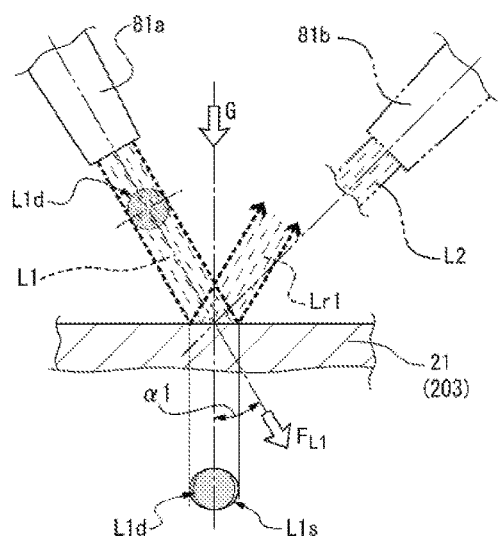
FIG. 4A
FIG. 4B
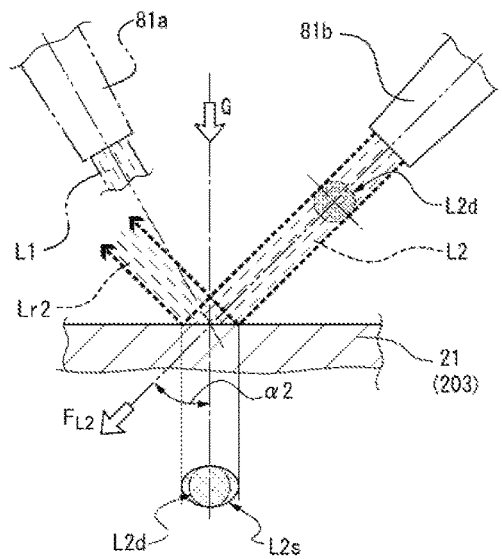
FIG. 4C
FIG. 4D
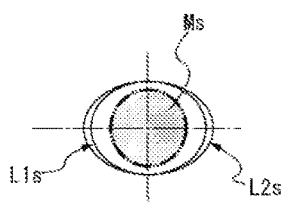
FIG. 4E

< SECTIONAL VIEWS >    < EXTERNAL PLAN VIEWS >

THREE-DIMENSIONAL FORMING APPARATUS AND THREE-DIMENSIONAL FORMING METHOD

CROSS-REFERENCE TO RELATED APPLICATIONS

This application is a continuation of U.S. patent application Ser. No. 15/183,585 filed on Jun. 15, 2016, which claims priority to Japanese Patent Application No. 2015-120869 filed on Jun. 16, 2015. The entire disclosures of U.S. patent application Ser. No. 15/183,585 and Japanese Patent Application No. 2015-120869 are hereby incorporated herein by reference.

BACKGROUND

1. Technical Field

The present invention relates to a three-dimensional forming apparatus and a three-dimensional forming method.

2. Related Art

In the related art, a method described in JP-A-2008-184622 is disclosed as a manufacturing method of simply forming a three-dimensional shape using a metal material. The three-dimensional fabricated object manufacturing method disclosed in JP-A-2008-184622 is used to form a metal paste, which includes metal powder, a solvent, and an adhesion enhancer in a raw material, in material layers of a layered state. Then, metal sintered layers or metal melted layers are formed by radiating a light beam to material layers in the layered state and the sintered layers or the melted layers are stacked by repeating the forming of the material layers and the radiation of the light beam, so that a desired three-dimensional fabricated object can be obtained.

However, in a method of manufacturing the three-dimensional fabricated object, as disclosed in JP-A-2008-184622, only parts of the material layers supplied in a layer state are sintered or melted through the radiation of the light beam to be formed as a part of the fabricated object. Thus, the material layers to which the light beam is not radiated become an unnecessary portion to be removed. In a region to which a predetermined light beam is radiated, a sintered or melted material layer is generated near even the region even when the sintered or melted material layer is incomplete. The incomplete portion is attached to a portion formed through desired sintering or melting, and thus there is a problem that the shape of the fabricated object is unstable.

Accordingly, by radiating a laser while supplying a powder metal material to a desired portion, as disclosed in JP-A-2005-219060 or JP-A-2013-75308 and applying a nozzle capable of forming a metal-built portion, it is possible to achieve a solution to the problem of JP-A-2008-184622.

The nozzle disclosed in JP-A-2005-219060 or JP-A-2013-75308 includes a laser radiation unit in the center of the nozzle and includes a powder supply unit supplying metal powder (powder) in the periphery of the laser radiation unit. The powder is supplied toward the laser radiated from the laser radiation unit at the center of the nozzle and the supplied powder is melted by a laser to be formed as a built metal on a construction object.

However, in a case in which the built metal is formed using the nozzle disclosed in JP-A-2005-219060 or JP-A-2013-75308, it is difficult to more minutely form the particle diameter of the metal powder to be applied. That is, the metal powder becomes so-called strong adhesive powder in which adhesion between particles is increased since the powder is so-called fine powder with a fine particle diameter. Thus, for example, when the powder is transferred and ejected by compressed air or the like, the powder is easily attached to a flow passage. Thus, fluidization considerably deteriorates and ejection stability is damaged. Accordingly, there is a limit that the particle diameter of the powder is reduced to ensure the fluidization of the powder, and thus it is difficult to use the nozzle disclosed in JP-A-2005-219060 or JP-A-2013-75308 to form a fine and high-precise three-dimensional shape which may not be realized unless powder with a fine particle diameter is used.

SUMMARY

An advantage of some aspects of the invention is to provide a three-dimensional forming apparatus and a three-dimensional forming method capable of using metal powder with a fine particle diameter to form a minute three-dimensional fabricated object.

The invention can be implemented as the following forms or application examples.

Application Example 1

A three-dimensional forming apparatus according to this application example includes: a stage; a material supply mechanism that supplies a sinterable material in which metal powder and a binder are kneaded to a stage; a drying mechanism that dries the sinterable material supplied from the material supply mechanism to the stage to form a dry sinterable material; an energy radiation mechanism that supplies energy capable of sintering the dry sinterable material; and a driving mechanism that is able to three-dimensionally move the material supply mechanism, the drying mechanism, and the energy radiation mechanism relative to the stage. The material supply mechanism includes a material ejection unit supplying a predetermined amount of the sinterable material in a gravity direction. The energy radiation mechanism includes an energy radiation unit outputting the energy. The material ejection unit and the energy radiation unit are held in the holding mechanism.

In the three-dimensional forming apparatus according to this application example, the amount of sinterable material necessary in a formation region of the three-dimensional fabricated object to be formed is supplied and the energy is supplied to the supplied sinterable material by the energy radiation mechanism. Therefore, a loss of the material supply and a loss of the supply energy are reduced.

In related art, in a case in which only metal powder is supplied and sintered, the metal powder becomes so-called strong adhesive powder in which adhesion between metal particles is increased. Thus, in a case in which the powder is transferred and ejected by compressed air or the like, the powder is easily attached to a flow passage. Thus, fluidization considerably deteriorates and there is a limit to which the particle diameter of the metal powder is reduced. However, by setting a configuration in which the sinterable material, in which the metal powder and the binder are kneaded, is supplied from the material supply mechanism to the stage, it is possible to prevent the powder from being attached to a flow passage of material transfer and so the material can be more stably supplied. Thus, the three-dimensional fabricated object can be formed using very fine metal powder.

The metal powder may scatter since liquid components of a solvent or the like kneaded and included in the sinterable material are transpired in a very short time, that is, are explosively evaporated by large energy radiated from the energy radiation mechanism to the degree that the sinterable material is sintered. Thus, by providing the drying mechanism capable of transpiring the liquid components in advance before the sintering, it is possible to prevent the metal powder from scattering at the time of the sintering.

By removing the liquid components which contribute to an improvement in the fluidity of the sinterable material from the sinterable material ejected onto the stage by the drying mechanism, the fluidity of the sinterable material on the stage can be reduced. Accordingly, it is possible to prevent the sinterable material from spreading along the upper surface of the stage after the sinterable material is ejected. Thus, the three-dimensional forming apparatus capable of forming an accurate three-dimensional fabricated object can be obtained.

In this application example, the sintering in "capable of sintering" refers to transpiring of a binder of the supply material due to the supplied energy and metal bonding between the remaining metal powder by the supplied energy by supplying the energy to the supply material. In the present specification, a form of the melting and bonding of the metal powder will be described as sintering performed by supplying the energy and bonding the metal powder.

Application Example 2

In the application example, the energy radiation mechanism may radiate the energy in a direction intersecting the gravity direction.

According to this application example, it is not necessary to relatively move the material supply mechanism and the energy radiation mechanism. Energy necessary for the sintering can be radiated to the sinterable material supplied from the material supply mechanism.

By radiating an energy ray radiated from the energy radiation unit to intersect the gravity direction, for example, a reflected energy ray reflected from the stage is not oriented toward the energy radiation unit. Accordingly, it is possible to prevent the energy radiation unit from being damaged due to the reflected energy ray.

Application Example 3

In the application example, the material ejection unit may eject the sinterable material in a liquid droplet form.

According to this application example, by forming the sinterable material in the minute liquid droplet form, supplying the sinterable material onto the stage, and sintering the sinterable material, the three-dimensional fabricated object is formed as an aggregate of sintered objects with minute shapes. Accordingly, minute portions can be formed, and thus a miniature and accurate three-dimensional fabricated object can be easily obtained.

Application Example 4

In the application example, a plurality of the energy radiation units may be included.

According to this application example, it is possible to uniformly supply the energy to the sinterable material supplied onto the stage.

Application Example 5

In the application example, the material supply mechanism may include a material supply unit supplying the sinterable material up to the material ejection unit including at least a material ejection port facing the stage. A plurality of the material supply units may be included and at least two kinds of the sinterable materials with different compositions may be supplied.

According to this application example, the material supply mechanism supplying the sinterable material for each different composition can be included. Thus, the material can be supplied from each material supply mechanism of each composition, and thus different materials can be sintered or melted by the energy radiation mechanisms. Thus, it is possible to easily form the fabricated object formed of the materials of two or more kinds of compositions.

Application Example 6

In the application example, the energy radiation mechanism may be a laser radiation mechanism.

According to this application example, the radiation of the energy can be focused on a supply material which is a target, and thus a three-dimensional fabricated object with good quality can be formed. For example, a radiated energy amount (power or a scanning speed) can be easily controlled according to a kind of sinterable material, and thus the three-dimensional fabricated object with desired quality can be obtained.

Application Example 7

In the application example, the drying mechanism may include a temperature detection mechanism detecting temperature of the dry sinterable material.

According to this application example, the heat energy from the energy radiation mechanism is added to the three-dimensional fabricated object separated from the drying mechanism. Accordingly, by including the temperature detection mechanism and acquiring temperature data of a region of a drying target obtained by the temperature detection mechanism, it is possible to control drying energy radiated from the drying mechanism, for example, an energy amount of heat ray so that the drying energy is optimum, and thus it is possible to prevent overdrying.

Application Example 8

A three-dimensional forming method of forming a three-dimensional fabricated object according to this application example includes: supplying a sinterable material in which metal powder and a binder are kneaded to a desired shape; drying the sinterable material supplied in the supplying of the sinterable material to form a dry sinterable material; forming a single layer by supplying energy capable of sintering the dry sinterable material to the dry sinterable material and sintering the dry sinterable material; forming a second single layer in the forming of the single layer by stacking the second single layer on the first single layer formed in the forming of the single layer; and repeating the forming of the second single layer a predetermined number of times to form a three-dimensional fabricated object. In the forming of the single layer, a predetermined formation region of the single layer is subjected to the sintering of the dry sinterable material performed on a unit material with a liquid droplet form landed by ejecting the sinterable material in the liquid droplet form in the supplying of the sinterable material.

In the three-dimensional forming method according to this application example, the amount of sinterable material necessary in a formation region of the three-dimensional fabricated object to be formed is supplied and the energy is supplied to the supplied sinterable material by the energy radiation mechanism. Therefore, a loss of the material supply and a loss of the supply energy are reduced.

In related art, in a case in which only metal powder is supplied and sintered, the metal powder becomes so-called strong adhesive powder in which adhesion between metal particles is increased. Thus, in a case in which the powder is transferred and ejected by compressed air or the like, the powder is easily attached to a flow passage. Thus, fluidization considerably deteriorates and there is a limit that the particle diameter of the metal powder is reduced. However, by setting a configuration in which the sinterable material in which the metal powder and the binder are kneaded is supplied from the material supply mechanism to the stage, it is possible to prevent the powder from being attached to a flow passage of material transfer. Thus, the three-dimensional fabricated object can be formed using very fine metal powder.

The metal powder may scatter since liquid components of a solvent or the like kneaded and included in the sinterable material are transpired in a very short time, that is, are explosively evaporated by large energy radiated from the energy radiation mechanism to the degree that the sinterable material is sintered. Thus, by providing the drying mechanism capable of transpiring the liquid components in advance before the sintering, it is possible to prevent the metal powder from scattering at the time of the sintering.

By removing the liquid components which contribute to an improvement in the fluidity of the sinterable material from the sinterable material ejected onto the stage by the drying mechanism, the fluidity of the sinterable material on the stage can be reduced. Accordingly, it is possible to prevent the sinterable material from spreading along the upper surface of the stage after the sinterable material is ejected. Thus, the three-dimensional forming method capable of forming an accurate three-dimensional fabricated object can be obtained.

Application Example 9

In the application example, an ejection direction of the sinterable material in the supplying of the sinterable material may be a gravity direction and a radiation direction of the energy in the sintering of the dry sinterable material may be a direction intersecting the gravity direction.

According to this application example, it is not necessary to relatively move the material supply mechanism and the energy radiation mechanism. Energy necessary for the sintering can be radiated to the sinterable material supplied from the material supply mechanism.

Application Example 10

In the application example, in the forming of the second single layer, a support portion supporting the single layer in a gravity direction may be formed. The support portion may be an unsintered portion to which the energy is not radiated in the sintering of the dry sinterable material.

According to this application example, in a case in which a so-called overhang in which the three-dimensional fabricated object is not formed is formed in the gravity direction, the support portion can be formed as a material supply surface. Then, it is possible to prevent the overhang from being deformed in the gravity direction and form the three-dimensional fabricated object with a desired shape.

Application Example 11

In the application example, the three-dimensional forming method may further include removing the support portion.

According to this application example, the support portion is in an unsintered state, and thus can be easily removed. Accordingly, even when the support portion is formed at any position, the three-dimensional fabricated object with an exact shape can be obtained without damaging the formation of the three-dimensional fabricated object as a finished product.

BRIEF DESCRIPTION OF THE DRAWINGS

The invention will be described with reference to the accompanying drawings, wherein like numbers reference like elements.

FIG. 2A is an external side view, and FIG. 2B is an external diagram when viewed from the upper surface.

FIG. 3A is an enlarged view illustrating a state before the drying, and FIG. 3B is an enlarged view illustrating a state after the drying.

FIGS. 4A to 4E are conceptual diagrams illustrating a relation between radiation angles of lasers and radiation energy to a unit material, FIGS. 4A and 4B are diagrams illustrating a radiation state of a first laser radiation unit, FIGS. 4C and 4D are diagrams illustrating a radiation state of a second laser radiation unit, and FIG. 4E is a diagram illustrating combined radiation region states illustrated in FIGS. 4B and 4D.

FIG. 6A is an external plan view, and FIG. 6B is an external side view.

DESCRIPTION OF EXEMPLARY EMBODIMENTS

Hereinafter, embodiments of the invention will be described with reference to the drawings.

First Embodiment

Figure 1:
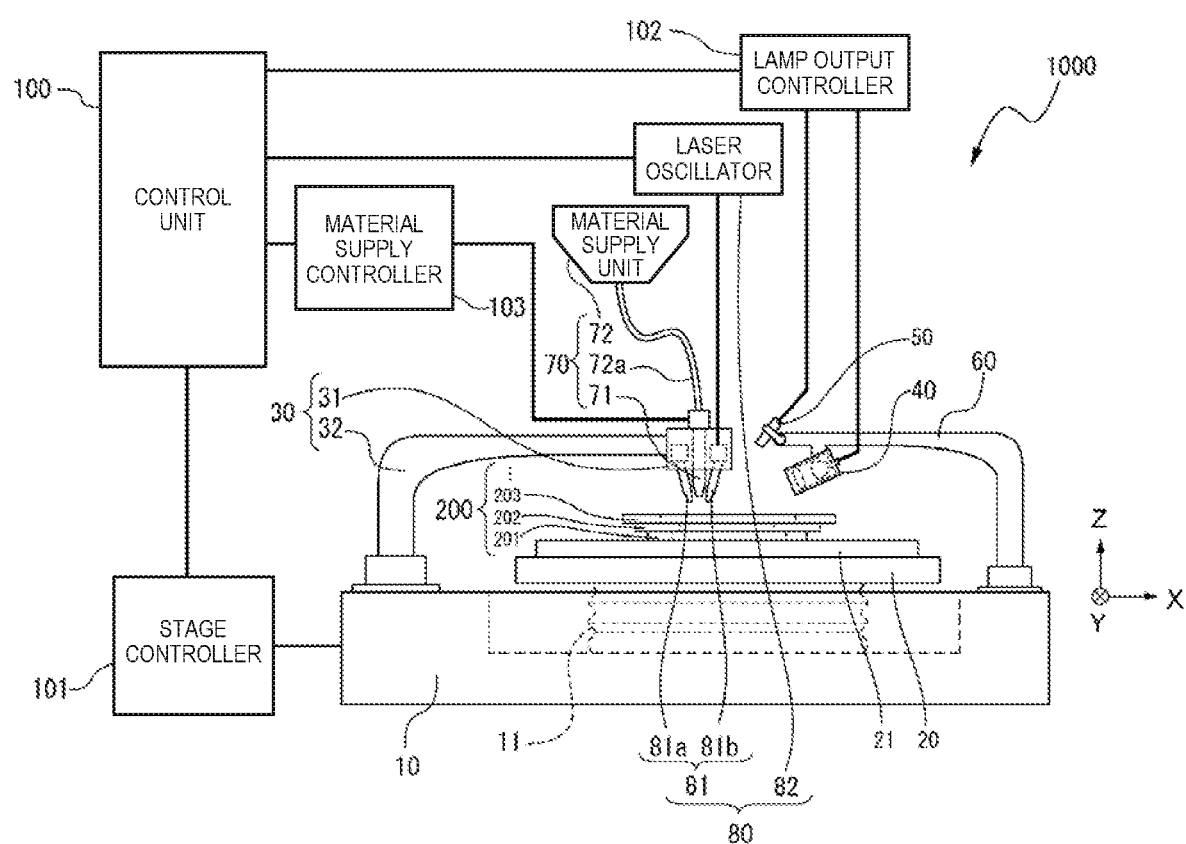
FIG. 1 is a schematic diagram illustrating the configuration of a three-dimensional forming apparatus according to a first embodiment.

FIG. 1 is a schematic diagram illustrating the configuration of a three-dimensional forming apparatus according to a first embodiment. In the present specification, "three-dimensional forming" refers to forming a so-called stereoscopically fabricated object and includes, for example, forming a shape having a thickness even when the shape is a flat shape or a so-called two-dimensional shape.

As illustrated in FIG. 1, a three-dimensional forming apparatus 1000 includes a base 10 and a stage 20 included to be able to be driven in the illustrated X, Y, and Z directions by a driving device 11 which serves as a driving mechanism included in the base 10. The three-dimensional forming apparatus 1000 further includes a head support unit 30 including a support arm 32 that has one end portion fixed to the base 10 and the other end portion holding and fixing a head 31 which serves as a holding mechanism holding a material supply mechanism and an energy radiation mechanism to be described below. The three-dimensional forming apparatus 1000 further includes a lamp support unit 60 which has one end portion fixed to the base 10 and the other end portion holding and fixing a halogen lamp 40 (hereinafter referred to as a lamp 40) which has as a drying mechanism and a noncontact thermometer 50 (hereinafter referred to as a thermometer 50) which measures temperature in a process of forming a three-dimensional fabricated object formed on the stage 20. In the embodiment, a configuration in which the stage 20 is driven in the X, Y, and Z directions by the driving device 11 will be described. However, the invention is not limited thereto. The stage 20 and the head 31 may be able to be relatively driven in the X, Y, and Z directions.

In a process of forming a three-dimensional fabricated object 200, partial fabricated objects 201, 202, and 203 are formed on the stage 20 in a layered state. In the forming of the three-dimensional fabricated objects 200, as will be described below, the sample plate 21 that has heat resistance property may be used to protect against heat of the stage 20 so that the three-dimensional fabricated objects 200 are formed on the sample plate 21, since the heat energy is radiated from the laser. For example, a ceramic plate can be used as the sample plate 21 to obtain the high heat resistance property, and further reactivity with a sinterable or melted supply material is low and the three-dimensional fabricated objects 200 can be prevented from degrading. In FIG. 1, to facilitate the description, three layers of the partial fabricated objects 201, 202, and 203 have been exemplified, but partial fabricated objects are stacked until the desired shapes of the three-dimensional fabricated objects 200 are obtained.

The head 31 holds a material ejection unit 71 that is included in the material supply device 70 serving as a material supply mechanism and a laser radiation unit 81 serving as an energy radiation mechanism included in a laser radiation device 80 serving as an energy radiation unit. The laser radiation unit 81 includes a first laser radiation unit 81a and a second laser radiation unit 81b according to the embodiment.

The three-dimensional forming apparatus 1000 includes a control unit 100 serving as a control mechanism which controls the stage 20, the material ejection unit 71 included in the material supply device 70, the laser radiation device 80, and the lamp 40 described above based on, for example, fabrication data of the three-dimensional fabricated object 200 output from a data output apparatus such as a personal computer (not illustrated). The control unit 100 includes at least a driving control unit of the stage 20, an operation control unit of the material ejection unit 71, an output control unit of the lamp 40, and an operation control unit of the laser radiation device 80, although not illustrated. The control unit 100 further includes a control unit that drives and operates the stage 20, the material ejection unit 71, the lamp 40, and the laser radiation device 80 in tandem.

For the stage 20 included to be movable to the base 10, signals for controlling movement start or stop off of the stage 20 and a movement direction, a movement amount, a movement speed, or the like and are generated in the stage controller 101 based on a control signal from the control unit 100 and are sent to the driving device 11 included in the base 10, so that the stage 20 is moved in the illustrated X, Y, or Z direction.

In the material ejection unit 71 fixed to the head 31, a signal for controlling a material ejection amount or the like from the material ejection unit 71 is generated in a material supply controller 103 based on the control signal from the control unit 100 and a predetermined amount of material is ejected from the material ejection unit 71 based on the generated signal.

A supply tube 72a serving as a material supply path extends from the material supply unit 72 included in the material supply device 70 and is connected to the material ejection unit 71. In the material supply unit 72, a sinterable material including a raw material of the three-dimensional fabricated object 200 fabricated by the three-dimensional forming apparatus 1000 according to the embodiment is accommodated as a supply material. The sinterable material which is the supply material is a mixed material of a slurry state (or a paste form) obtained by kneading, for example, an elementary powder of metals such as magnesium (Mg), iron (Fe), cobalt (Co), chrome (Cr), aluminum (Al), titanium (Ti), and nickel (Ni) which are raw materials of the three-dimensional fabricated object 200, or a mixed powder of an alloy including one or more of the metals with a solvent and a thickener serving as a binder.

The metal powder preferably has an average particle diameter of 10 μm or less. Examples of a solvent or a dispersion medium include not only various kinds of water such as distilled water, pure water, and RO water but also alcohols such as methanol, ethanol, 2-propanol, 1-butanol, 2-butanol, octanol, ethylene glycol, diethylene glycol, and glycerin, ethers (cellosolves) such as ethylene glycol monomethyl ether (methyl cellosolve), ethylene glycol monoethyl ether (ethyl cellosolve), ethylene glycol monophenyl ether (phenyl cellosolve), esters such as methyl acetate, ethyl acetate, butyl acetate, and ethyl formate, ketones such as acetone, methyl ethyl ketone, diethyl ketone, methyl isobutyl ketone, methyl isopropyl ketone, and cyclohexanone, aliphatic hydrocarbons such as pentane, hexane, and octane, cyclic hydrocarbons such as cyclohexane and methylcyclohexane, aromatic hydrocarbons having long-chain alkyl group and benzene rings, such as benzene, toluene, xylene, hexyl benzene, butyl benzene, octyl benzene, nonyl benzene, decyl benzene, undecyl benzene, dodecyl benzene, tridecyl benzene, and tetradecyl benzene, halogenated hydrocarbons such as methylene chloride, chloroform, carbon tetrachloride, and 1,2-dichloroethane, aromatic heterocycles such as pryridine, pyrazine, furan, pyrrole, thiophene, and methyl pyrrolidone, nitriles such as acetonitrile, propionitrile, and acrylonitrile, amides such as N,N-dimethylformamide and N,N-dimethy acetamide, carboxylate or other various other oils.

The thickener is not limited as long as the thickener is soluble in the above-described solvent or dispersion medium. For example, an acrylic resin, an epoxy resin, a silicone resin, a cellulose-based resin, or a synthetic resin can be used. For example, a thermoplastic resin such as polylactic acid (PLA), polyamide (PA), or polyphenylene sulfide (PPS) is used. In a case in which a thermoplastic resin is used, flexibility of the thermoplastic resin is maintained by heating the material ejection unit 71 and the material supply unit 72. A silicone oil or the like is used as a heat-resistant solvent to improve the flexibility.

In the lamp 40 fixed to the lamp support unit 60, the material ejected from the material ejection unit 71 and landed to the sample plate 21 or the topmost layer of the partial fabricated object, 201, 202, or 203, in this example, the partial fabricated object 203, is dried by the heat radiated from the lamp 40. That is, liquid components are transpired from the material in which the metal powder and the solvent or the dispersion medium, and the thickener are kneaded. Accordingly, the lamp 40 is preferably disposed toward the landed region of the material ejected from the material ejection unit 71. The drying mechanism is not limited to the lamp 40. For example, the drying mechanism may be a mechanism or the like heating the partial fabricated object by heating and drying the partial fabricated object or heating the stage 20 by an infrared lamp or high-frequency radiation.

In the laser radiation unit 81 included in the laser radiation device 80 fixed to the head 31, based on a control signal from the control unit 100, lasers with a predetermined output are oscillated from a laser oscillator 82 and the lasers are radiated from the laser radiation unit 81. The lasers are radiated to the supply material ejected from the material ejection unit 71 so that the metal powder included in the supply material is sintered or melted to be solidified. The lasers used for the three-dimensional forming apparatus 1000 according to the embodiment are not particularly limited. A fiber laser or a carbon dioxide laser is appropriately used since a wavelength is long and metal absorption efficiency is high. A fiber laser is more preferable since an output is high and a fabrication time can be shortened.

The partial fabricated object 203 of the topmost layer to which the material is ejected is heated by two heat sources of radiant heat from the above-described lamp 40 and laser radiation heat from the laser radiation unit 81. Accordingly, to avoid excessive heating, the lamp support unit 60 includes the thermometer 50. The thermometer 50 can contactlessly measure the temperature of a measurement target, and thus measures the temperature of the partial fabricated object 203 and transmits measured temperature data to a lamp output controller 102. The lamp output controller 102 performs control such that supply power to the lamp 40 is decreased in a case in which the measured temperature is higher than predetermined dry temperature of the material ejected from the material ejection unit 71 and the supply power is increased in a case in which the measured temperature is lower than the dry temperature.

Figures 2A, 2B:
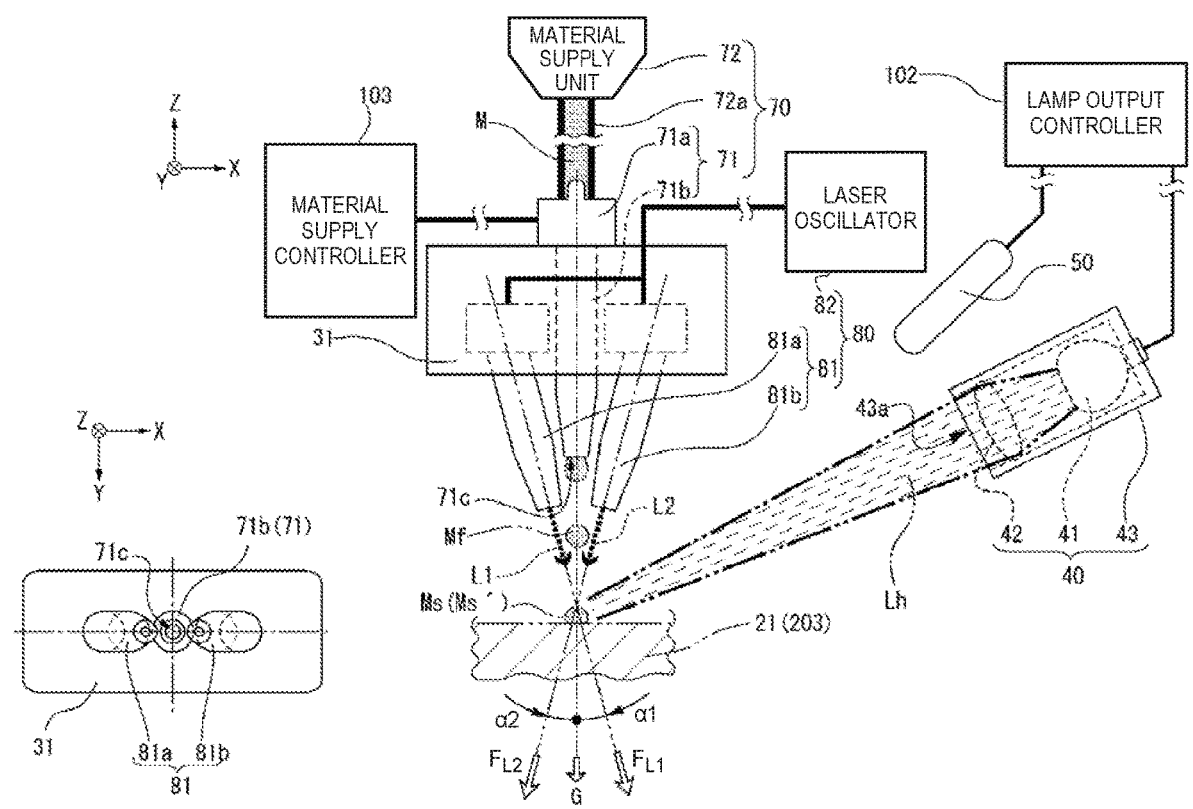
FIGS. 2A and 2B are diagrams illustrating a holding mechanism of the three-dimensional forming apparatus according to the first embodiment.

FIGS. 2A and 2B are external enlarged diagrams illustrating the head 31 illustrated in FIG. 1, the material ejection unit 71 and the laser radiation unit 81 held in the head 31, the lamp 40, the thermometer 50. FIG. 2A is an external diagram when viewed in the Y direction arrow illustrated in FIG. 1 and FIG. 2B is an external diagram when viewed in the Z direction arrow from the sample plate 21 illustrated in FIG. 2A.

As illustrated in FIG. 2A, the material ejection unit 71 held in the head 31 includes an ejection nozzle 71b and an ejection driving unit 71a that ejects a predetermined amount of material from the ejection nozzle 71b. A supply tube 72a linked to the material supply unit 72 is connected to the ejection driving unit 71a, so that a sinterable material M is supplied via the supply tube 72a. The ejection driving unit 71a includes an ejection driving device (not illustrated), and thus the sinterable material M is sent to the ejection nozzle 71b based on a control signal from the material supply controller 103.

The sinterable material M ejected from a material ejection port 71c (hereinafter referred to as an ejection port 71c) of the ejection nozzle 71b becomes a flying material part Mf with a liquid droplet form, that is, a substantially spherical form. The flying material part Mf flies toward the sample plate 21 or the partial fabricated object 203 of the topmost layer illustrated in FIG. 1 and is landed to the sample plate 21 or the partial fabricated object 203 to be formed as a unit material Ms with a liquid droplet form (hereinafter referred to as a unit material Ms) on the sample plate 21 or the partial fabricated object 203.

A heat ray Lh output from the lamp 40 serving as the drying mechanism is radiated to the unit material Ms formed on the sample plate 21 or the partial fabricated object 203 and the liquid components are transpired from the solvent or the dispersion medium and the thickener included in the unit material Ms, so that the unit material Ms is dried. The heat ray Lh may heat the unit material Ms at temperature which does not exceed the boiling point of the liquid components included in the solvent or dispersion medium, or the thickener included in the unit material Ms. That is, when the unit material Ms is heated up to temperature exceeding the boiling point of the liquid components included in the solvent or dispersion medium, or the thickener included in the unit material Ms, there is a concern of pumping occurring in the liquid components and the metal powder in the unit material Ms scattering. To prevent the metal powder from scattering, it is desirable to dry the metal powder at temperature which does not exceed the boiling point of the liquid components.

As illustrated in FIG. 2A, the lamp 40 includes a light source 41 that serves a heat source, a condensing lens 42 that converges the heat ray Lh output from the light source 41 to a radiation target, and a lens accommodation unit 43 that accommodates the light source 41 and the condensing lens 42 and includes an opening 43a through which the heat ray Lh converged from the condensing lens 42 is output. The lamp 40 is not limited to the form illustrated in FIG. 2A, but may be a light source (lamp) that includes a condensing and reflecting unit (reflector).

Figure 3A:
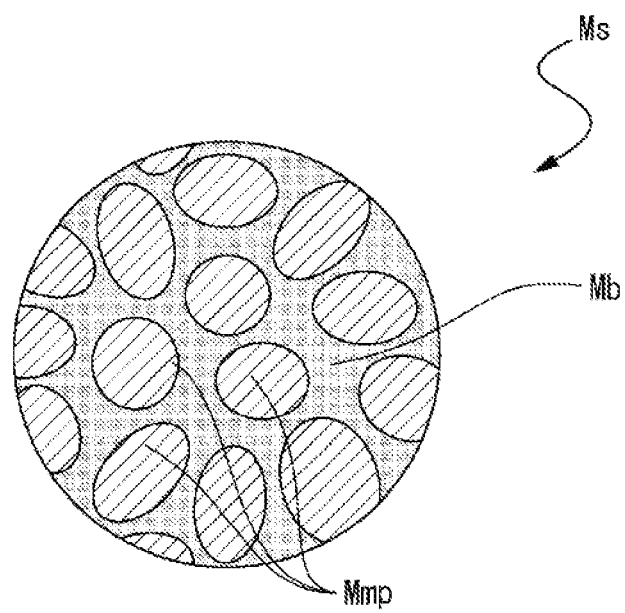
FIGS. 3A and 3B are conceptual diagrams illustrating drying of a sinterable material.
Figure 3B:
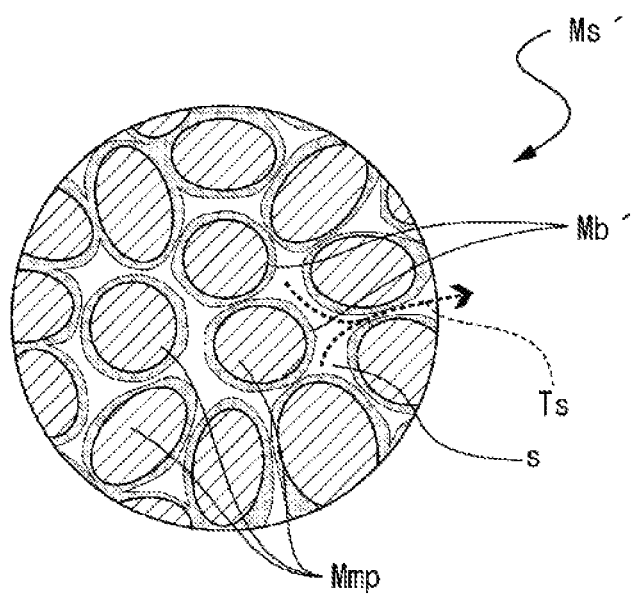

FIGS. 3A and 3B are conceptual diagrams illustrating drying of the unit material Ms, FIG. 3A is an enlarged view illustrating a state before the drying, and FIG. 3B is an enlarged view illustrating a state after the drying.

As illustrated in FIG. 3A, the unit material Ms in a state in which metal powder Mmp of the material forming the three-dimensional fabricated object 200 is kneaded with a binder Mb to scatter substantially uniformly is landed to the sample plate 21 or the partial fabricated object 203. When the heat ray Lh output from the lamp 40 is radiated to the unit material Ms, as illustrated in FIG. 3B, the liquid components included in the solvent or the dispersion medium and the thickener included in the binder Mb are transpired by the heat ray Lh, solid content other than the liquid components included in the binder Mb around the metal powder Mmb, for example, a dried binder Mb' including resin components, remains, and thus a unit material Ms' is formed as a dry sinterable material in which a space s corresponding to the volume of the liquid components is formed after the drying. The space s forms a communication path Ts communicating with itself. The communication path Ts communicates with the outside of the unit material Ms' after the drying.

As illustrated in FIG. 2A, the laser L1 from the first laser radiation unit 81a and a laser L2 from the second laser radiation unit 81b are output toward the dried unit material Ms'. The unit material Ms' is heated and baked by the laser L1 and the laser L2.

At this time, the lasers L1 and L2 provide large heat energy to the dried unit material Ms' in a short time. However, when the heat energy of the lasers L1 and L2 is radiated to the unit material Ms before the drying illustrated in FIG. 3A, there is a concern that the liquid components included in the solvent or the dispersion medium and the thickener kneaded in the unit material Ms are explosively transpired and the metal powder Mmp scatters. However, by drying the unit material Ms and radiating the lasers L1 and L2 to the dried state of the unit material Ms' illustrated in FIG. 3B, it is possible to avoid the explosive transpiration of the liquid components, and thus it is possible to prevent the metal powder Mmp from scattering. Even when the dried binder Mb' illustrated in FIG. 3B is gasified and transpired by the heat energy of the lasers L1 and L2, the unit material Ms' can be baked and sintered without outflow of the unit material Ms' to the outside via the inside of the space s or the communication path Ts of the space s and the scattering of the metal powder Mmp.

The flying material part Mf ejected from the ejection port 71c is preferably ejected in the gravity direction G indicated by an illustrated arrow from the ejection port 71c. That is, the flying material part Mf can be flied to a landing position reliably and the unit material Ms is disposed at a desired position by ejecting the flying material part Mf in the gravity direction G. Then, the flying material part Mf is ejected and landed in the gravity direction G. For the lasers L1 and L2 radiated to the dried unit material Ms', the laser L1 is output in an illustrated radiation direction $F_{L1}$ which forms an angle α1 with the gravity direction G in a direction intersecting the gravity direction G, that is, from the first laser radiation unit 81a to be radiated to the unit material Ms. Similarly, the laser L2 is output in an illustrated radiation direction $F_{L2}$ which forms an angle $α_2$ with the gravity direction G from the second laser radiation unit 81b to be radiated to the unit material Ms'.

As described above, when the lasers L1 and L2 are radiated to the dried unit material Ms' heated and dried by the lamp 40, there is a concern that the temperature of the unit material Ms to be subsequently ejected exceeds the dry temperature near the unit material Ms' to which the lasers L1 and L2 are radiated due to focus of the heat energy of the lasers L1 and L2 and the heat ray Lh from the lamp 40 for heating and drying. Accordingly, by measuring the temperature of the landing region of the unit material Ms to be subsequently ejected by the thermometer 50 and controlling the output power of the light source 41 included in the lamp 40 by the lamp output controller 102 based on the measured temperature data, it is possible to set the temperature of the landing region of the unit material Ms to be subsequently ejected in a predetermined temperature range.

As described above, the material supply device 70 included in the three-dimensional forming apparatus 1000 according to the embodiment ejects the flying material part Mf with the liquid droplet form from the material ejection unit 71. When fine metal powder of related art is ejected from a material supply port and is sintered by an energy ray such as a laser, the fine metal powder becomes so-called strong adhesive powder in which adhesion between particles is increased. Thus, for example, when the powder is transferred and ejected by compressed air or the like, the powder is easily attached to a flow passage, and thus the fluidity is considerably damaged. In the embodiment, however, it is possible to provide excellent fluidity using a kneaded material in which the fine metal powder with the average particle diameter of 10 μm or less, a solvent, and a thickener are kneaded as the sinterable material M of the material.

Further, by providing the high fluidity, a small amount of sinterable material M can be formed in the liquid droplet form and can be ejected from the ejection port 71c of the material ejection unit 71. Thus, the unit material Ms can be disposed on the sample plate 21 or the partial fabricated object 203. Furthermore, by drying the unit material Ms by the lamp 40 to form the dried unit material Ms', it is possible to suppress deformation of the landed unit material Ms', for example, collapse or flow along the upper surface of the sample plate 21 or the partial fabricated object 203. That is, it is possible to form the minute three-dimensional fabricated object as a continuum of a small amount of fabrication.

By radiating the lasers L1 and L2 in the directions $F_{L1}$ and $F_{L2}$ intersecting the gravity direction to be oriented toward a position at which the unit material Ms is formed, it is possible to radiate the lasers L1 and L2 to the unit material Ms without moving relative positions of the head 31 and the sample plate 21 or the partial fabricated object 203.

Further, by drying the unit material Ms by the lamp 40 before the radiation of the lasers L1 and L2 to form the dried unit material Ms', the metal powder Mmp included in the unit material Ms' does not scatter even when the high energy of the lasers L1 and L2 is radiated in a short time. Accordingly, it is possible to form the highly precise three-dimensional fabricated object 200.

FIGS. 4A to 4E are conceptual diagrams illustrating a relation between the radiation angles α1 and α2 of the lasers L1 and L2 and radiation energy to the unit material Ms. FIGS. 4A and 4B are diagrams illustrating a radiation state of the first laser radiation unit 81a and the laser L1 output from the first laser radiation unit 81a. FIGS. 4C and 4D are diagrams illustrating a radiation state of the second laser radiation unit 81b and the laser L2 output from the second laser radiation unit 81b. FIG. 4E is a diagram illustrating combined and drawn radiation region states of FIGS. 4B and 4D in which the lasers L1 and L2 are radiated.

As illustrated in FIG. 4A, the laser L1 is output toward the upper surface of the sample plate 21 or the partial fabricated object 203 from the first laser radiation unit 81a in the direction $F_{L1}$ forming the angle α1 with the gravity direction G. The laser L1 output from the first laser radiation unit 81a has a laser output form L1d with a substantially circular shape on the cross-sectional surface which is a surface orthogonal to the output direction $F_{L1}$. When the laser L1 reaches the upper surface of the sample plate 21 or the partial fabricated object 203, the laser output form L1d becomes a laser radiation form L1s with an elliptical shape due to the slope of the angle α1 of the radiation direction $F_{L1}$, as illustrated in FIG. 4B.

Similarly, as illustrated in FIG. 4C, the second laser radiation unit 81b outputs the laser L2 toward the upper surface of the sample plate 21 or the partial fabricated object 203 from the second laser radiation unit 81b in the direction $F_{L2}$ forming the angle α2 with the gravity direction G. The laser L2 output from the second laser radiation unit 81b has a laser output form L2d with a substantially circular shape on the cross-sectional surface which is a surface orthogonal to the output direction $F_{L2}$. When the laser L2 reaches the upper surface of the sample plate 21 or the partial fabricated object 203, a laser output form L2d becomes a laser radiation form L2s with an elliptical shape due to the slope of the angle α2 of the radiation direction $F_{L2}$, as illustrated in FIG. 4D. As illustrated in FIG. 4E, the lasers L1 and L2 are radiated so that the unit material Ms' (see FIGS. 2A and 2B) landed to the upper surface of the sample plate 21 or the partial fabricated object 203 and dried is disposed in the areas of the laser radiation forms L1s and L2s.

As described above, the lasers L1 and L2 are radiated in the directions $F_{L1}$ and $F_{L2}$ intersecting the gravity direction G, and then reflected lasers Lr1 and Lr2 reflected from the sample plate 21 or the partial fabricated object 203 travel in opposite angle direction to the axial line of the gravity direction G, as illustrated in FIGS. 4A and 4C. Accordingly, the reflected lasers Lr1 and Lr2 of the lasers L1 and L2 are not oriented to the laser radiation units 81a and 81b, and thus it is possible to prevent the laser radiation units 81a and 81b from being damaged.

The three-dimensional forming apparatus 1000 according to the above-described first embodiment is configured to include the two laser radiation units 81a and 81b, but the invention is not limited thereto. For example, the three-dimensional forming apparatus 1000 may include one laser radiation unit or three or more laser radiation units. The laser radiation units 81a and 81b are mounted on the head 31 so that the lasers L1 and L2 are radiated in the directions $F_{L1}$ and $F_{L2}$ intersecting the gravity direction G, but the invention is not limited thereto. The form in which the lasers L1 and L2 are used as the radiated energy in the three-dimensional forming apparatus 1000 according to the embodiment has been described, but the invention is not limited thereto. For example, a high frequency, a halogen lamp, or the like may be used as long as the amount of heat for sintering the sinterable material M can be supplied.

Second Embodiment

Figure 5:
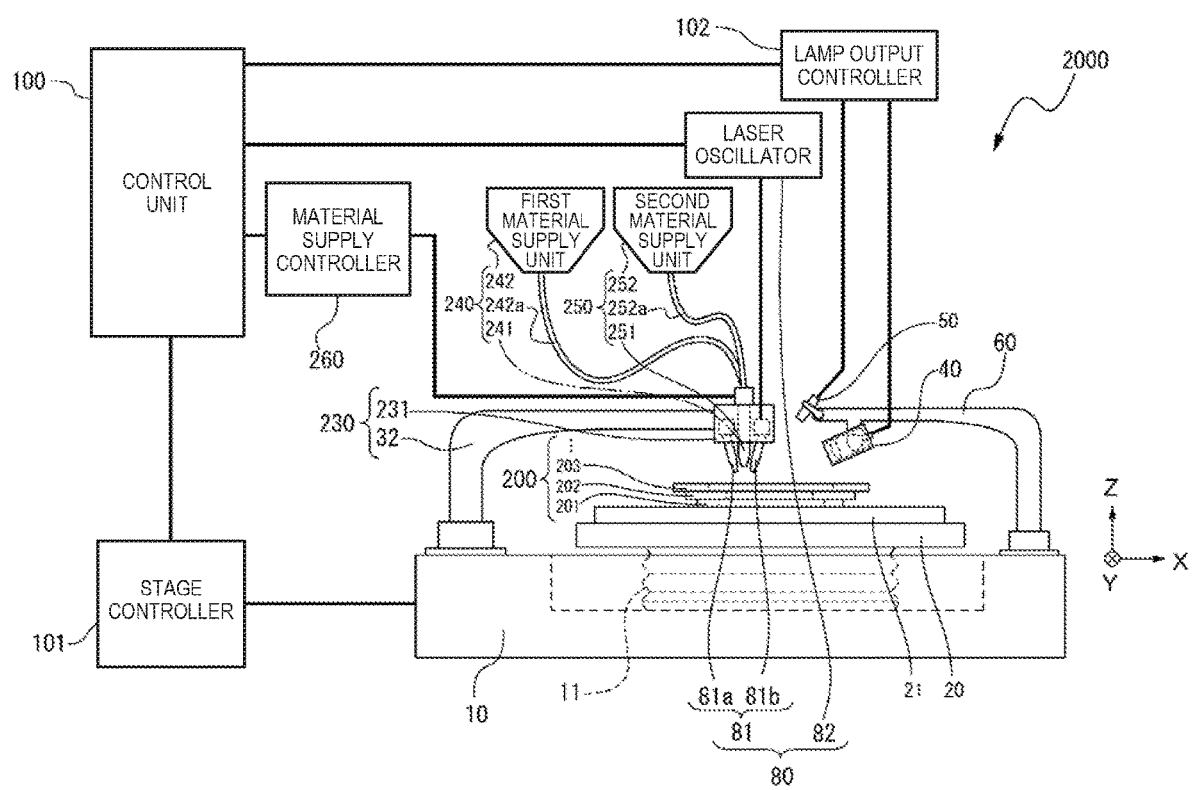
FIG. 5 is a schematic diagram illustrating the configuration of a three-dimensional forming apparatus according to a second embodiment.
Figure 6A:
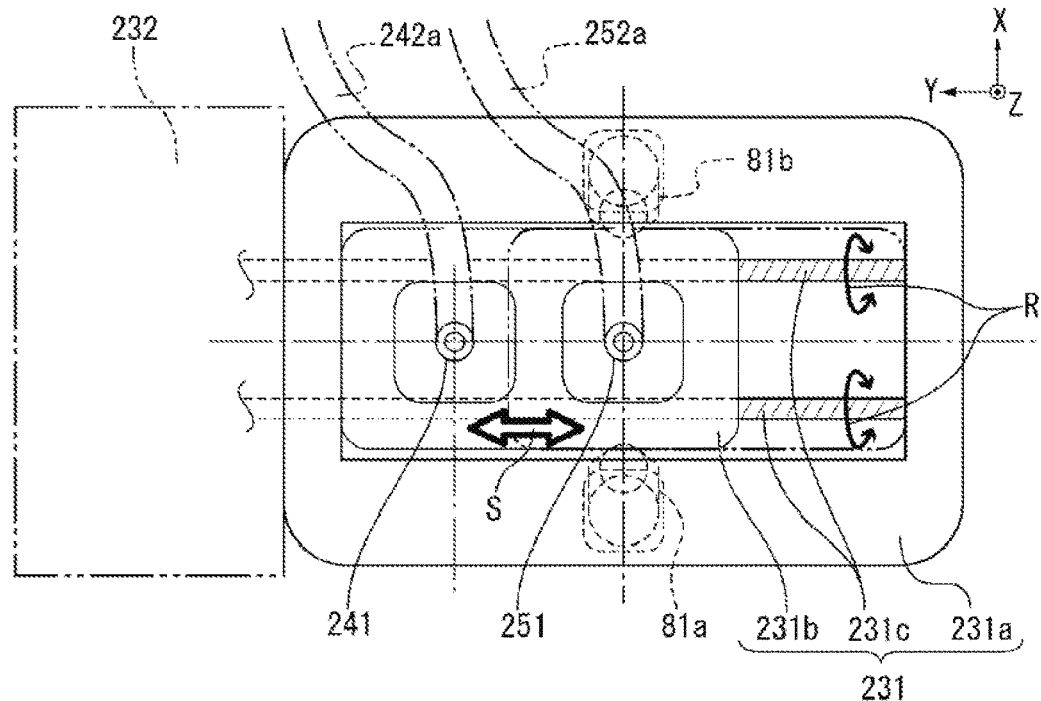
FIGS. 6A and 6B are diagrams illustrating a holding mechanism of the three-dimensional forming apparatus according to the second embodiment.
Figure 6B:
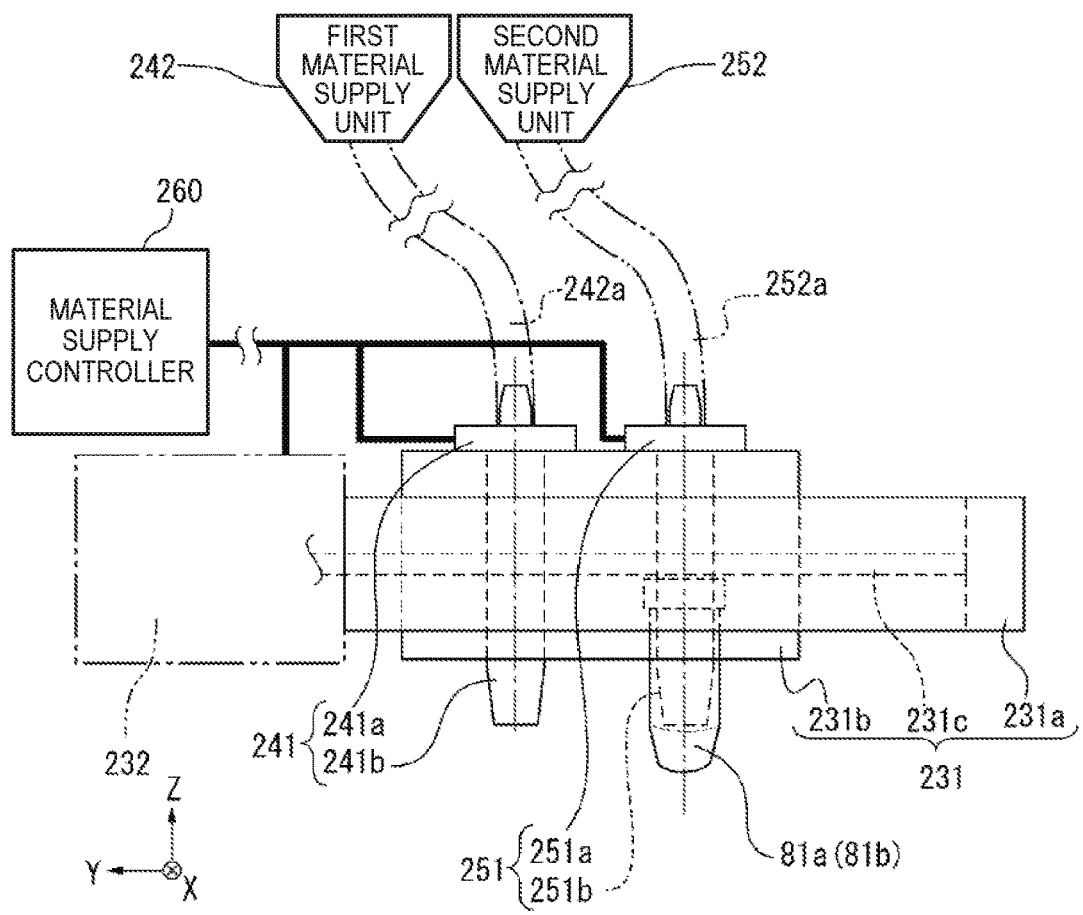

FIG. 5 is a schematic diagram illustrating the configuration of a three-dimensional forming apparatus 2000 that forms a three-dimensional fabricated object with a plurality of sinterable materials according to a second embodiment. FIGS. 6A and 6B are diagrams illustrating the detailed configuration of a head 231, FIG. 6A is an external plan view illustrating the head 231 in the Z axis when viewed from the drawing upper side of FIG. 5, and FIG. 6B is an external side view in the X axis direction. The three-dimensional forming apparatus 2000 is different from the three-dimensional forming apparatus 1000 according to the first embodiment in the configuration of the material supply device 70. The same reference numerals are given to the same constituent elements and the description thereof will be omitted.

As illustrated in FIG. 5, the three-dimensional forming apparatus 2000 according to the second embodiment includes a first material supply device 240 and a second material supply device 250 serving as a material supply mechanism. The first material supply device 240 includes a first material supply unit 242, a first supply tube 242a, and a first material ejection unit 241 held in the head 231 to which the first supply tube 242a is linked. Similarly, the second material supply device 250 includes a second material supply unit 252, a second supply tube 252a, and a second material ejection unit 251 held in the head 231 to which the second supply tube 252a is linked.

As illustrated in FIG. 6A, the head 231 includes a movable head 231b in a head body 231a. In the embodiment, the movable head 231b includes driving screw shafts 231c that are disposed to be movably driven in the head body 231a and a driving device 232 that rotatably drives the driving screw shafts 231c. The movable head 231b includes a screw engagement portion that reciprocates the movable head 231b in an S direction illustrated in the Y axis direction to correspond to a rotation direction R of the rotating driving screw shafts 231c.

In the movable head 231b, a first ejection nozzle 241b and a second ejection nozzle 251b are held. In the head body 231a, the first laser radiation unit 81a and the second laser radiation unit 81b included in the laser radiation device 80 are held.

In the head 231 of the three-dimensional forming apparatus 2000 according to the embodiment, as illustrated in FIGS. 6A and 6B, the movable head 231b is moved to correspond to radiation positions of the laser radiation units 81a and 81b so that the second ejection nozzle 251b is disposed. As illustrated in FIG. 6B, based on an instruction of material supply for the second material supply device 250, the material supply controller 260 inputs a signal for causing the driving device 232 to drive the driving screw shafts 231c and moving the movable head 231b up to a predetermined position, so that the movable head 231b is moved. After the movable head 231b reaches the predetermined position, a material ejection driving signal is input to the ejection driving unit 251a included in the second material ejection unit 251 and the material accommodated in the second material supply unit 252 is ejected from the second ejection nozzle 251b.

In a case of proceeding to subsequent material supply by the first material supply device 240, the material supply controller 260 outputs a signal for stopping the material supply from the second material supply device 250, the driving device 232 is caused to drive the driving screw shafts 231c, and a signal for moving the movable head 231b up to a predetermined position is input, so that the movable head 231b is moved. After the movable head 231b reaches the predetermined position, a material ejection driving signal is input to the ejection driving unit 241a included in the first material ejection unit 241 and the material accommodated in the first material supply unit 242 is ejected from the ejection nozzle 241b.

In this way, by reciprocating the movable head 231b in the S direction, the desired sinterable material can be ejected from the first material supply device 240 or the second material supply device 250 to the radiation region of the lasers L1 and L2 from the laser radiation units 81a and 81b. In the embodiment, the form in which two kinds of sinterable materials are ejected has been described, but the invention is not limited thereto. For example, a plurality of material supply devices can be included according to the kinds of materials.

The form in which the first material ejection unit 241 and the second material ejection unit 251 are included to correspond to two kinds of sinterable materials in the three-dimensional forming apparatus 2000 according to the embodiment has been described. Although not illustrated, for example, a flow passage conversion device capable of switching a supply material can be provided in a halfway portion of a supply tube 42a in the configuration of the three-dimensional forming apparatus 1000 according to the first embodiment. Then, it is possible to eject a plurality of sinterable materials from one material ejection unit 71.

Third Embodiment

Figure 7A:
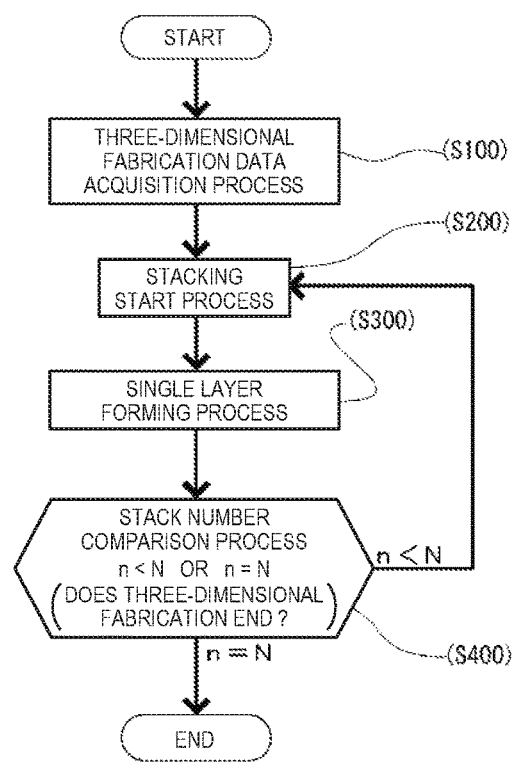
FIG. 7A is a flowchart illustrating a three-dimensional forming method according to a third embodiment and FIG. 7B is a detailed flowchart illustrating a single layer forming process illustrated in FIG. 7A.
Figure 7B:
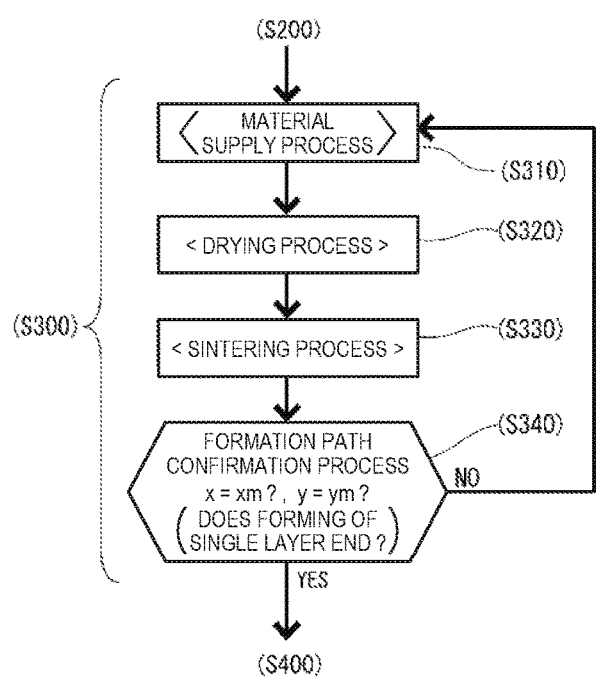

A three-dimensional forming method of forming a three-dimensional fabricated object using the three-dimensional forming apparatus 1000 according to the first embodiment will be described according to a third embodiment. FIG. 7A is a flowchart illustrating the three-dimensional forming method according to the third embodiment. FIG. 7B is a detailed flowchart illustrating a single layer forming process (S300) illustrated in FIG. 7A. FIGS. 8A to 9C are partial sectional views illustrating the three-dimensional forming method according to the embodiment.

Three-Dimensional Fabrication Data Acquisition Process

As illustrated in FIG. 7A, in the three-dimensional forming method according to the embodiment, a three-dimensional fabrication data acquisition process (S100) of acquiring three-dimensional fabrication data of the three-dimensional fabricated object 200 from, for example, a personal computer (not illustrated) by the control unit 100 (see FIG. 1) is performed. As the three-dimensional fabrication data acquired in the three-dimensional fabrication data acquisition process (S100), control data is transmitted from the control unit 100 to the stage controller 101, the material supply controller 103, the laser oscillator 82, and the lamp output controller 102, and then the process proceeds to a stacking start process.

Stacking Start Process

Figure 8A:
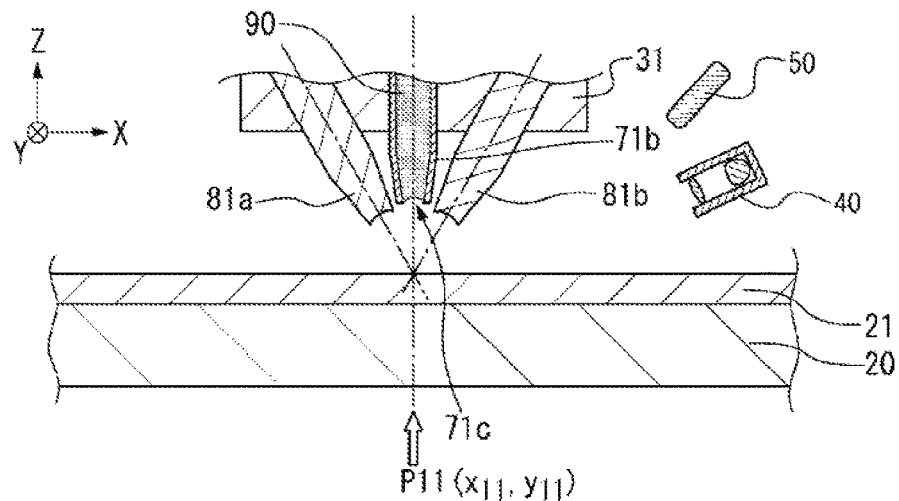
FIGS. 8A to 8C are partial sectional views illustrating a process in the three-dimensional forming method according to the third embodiment.

In a stacking start process (S200), as illustrated in FIG. 8A illustrating the three-dimensional forming method, the head 31 is disposed at a predetermined relative position to the sample plate 21 placed on the stage 20. At this time, on the XY plane (see FIG. 1), the stage 20 including the sample plate 21 is moved so that the flying material part Mf (see FIGS. 2A and 2B) which is the sinterable material with the liquid droplet form ejected from the ejection port 71c of the ejection nozzle 71b of the material ejection unit 71 is landed at a coordinate position P11 ($x_{11}$, $y_{11}$) of the stage 20 which is a fabrication start point based on the above-described three-dimensional fabrication data, the three-dimensional fabricated object starts to be formed, and then the process proceeds to a single layer forming process.

Single Layer Forming Process

Figure 8B:
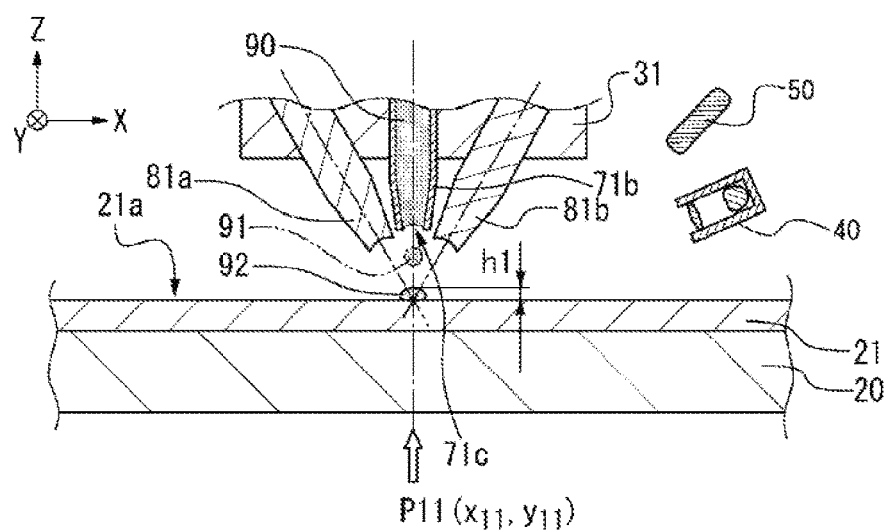

As illustrated in FIG. 7B, the single layer forming process (S300) includes a material supply process (S310), a drying process (S320), and a sintering process (S330). First, in the material supply process (S310), as illustrated in FIG. 8B, the sample plate 21 is moved so that the ejection nozzle 71b held in the head 31 faces the position P11 ($x_{11}$, $y_{11}$) which is a predetermined position in the stacking start process (S200), and then a supply material 90 which is the sinterable material is ejected as a flying material part 91 with the liquid droplet form in the gravity direction from the ejection port 71c of the ejection nozzle 71b to the sample plate 21 (see FIGS. 2A and 2B). The supply material 90 is a material in which an elementary powder of a metal which is the raw material of the three-dimensional fabricated object 200, for example, an alloy of stainless steel and titanium, or a mixed powder of stainless steel and copper (Cu) which are difficult to alloy, an alloy of stainless and titanium, or a titanium alloy and cobalt (Co) or chrome (Cr) is kneaded with a solvent and a thickener serving as a binder, and is adjusted in a slurry state (or a paste form).

A flying material part 91 is landed to an upper surface 21a of the sample plate 21 to be formed as a unit material 92 with a liquid droplet form (hereinafter referred to as a unit material 92) at the position P11 ($x_{11}$, $y_{11}$) on the upper surface 21a, and then the material supply process (S310) ends. The flying material part 91 is ejected from the ejection port 71c in the gravity direction and flies, and thus the unit material 92 can be accurately landed at the position P11 ($x_{11}$, $y_{11}$) at which the unit material 92 is set to be landed.

Figure 8C:
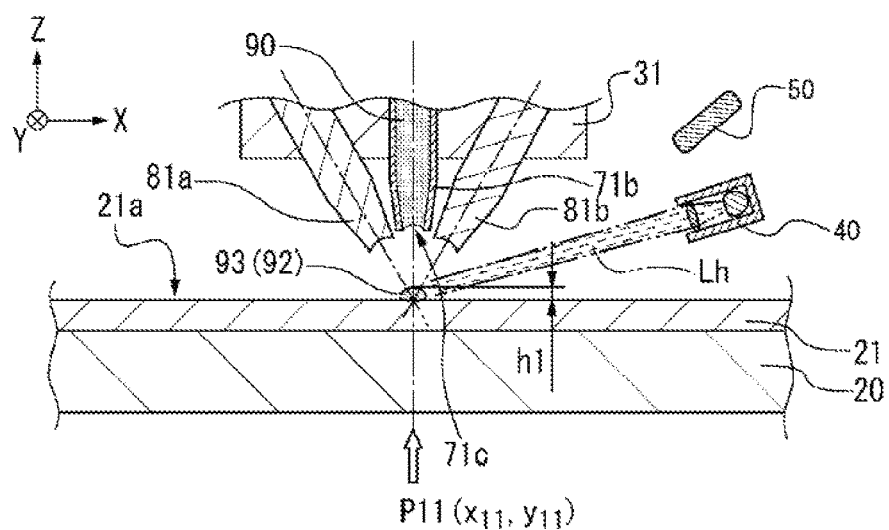

Next, the process proceeds to the drying process (S320). In the drying process (S320), as illustrated in FIG. 8C, the heat ray Lh is radiated from the lamp 40 to the unit material 92 landed to the upper surface 21a of the sample plate 21 in the material supply process (S310). At this time, the temperature of the upper surface 21a of the sample plate 21 is measured by the thermometer 50, the power to be input to the lamp 40 is controlled, and energy of the heat ray Lh with a predetermined dry temperature is radiated to the unit material 92. Then, a unit material 93 which is a dry sinterable material after the drying in which the liquid components are transpired and dried is formed. Accordingly, the unit material 93 after the drying has worse fluidity than the unit material 92 before the drying, spreading along the upper surface 21a is suppressed, and thus a height h1 (so-called buildup amount) from the upper surface 21a of the sample plate 21 can be ensured for the unit material 93.

The heat ray Lh may heat the unit material 92 at temperature which does not exceed the boiling point of the liquid components included in the solvent or dispersion medium, or the thickener included in the unit material 92. That is, when the unit material 92 is heated up to temperature exceeding the boiling point of the liquid components included in the solvent or dispersion medium, or the thickener included in the unit material 92, there is a concern of pumping occurring in the liquid components and the metal powder in the unit material Ms scattering. To prevent the metal powder from flying, it is desirable to dry the metal powder at temperature which does not exceed the boiling point of the liquid components.

When the unit material 93 is disposed on the upper surface 21a through the drying process (S320), the sintering process (S330) starts. In the sintering process (S330), illustrated in FIG. 9A, the lasers L1 and L2 are radiated to intersect each other from the laser radiation units 81a and 81b to the unit material 93 in the gravity direction (see FIGS. 2A and 2B). The dried binder Mb' (see FIG. 3B) included in the unit material 93 is transpired by the energy (heat) of the lasers L1 and L2, the metal powder particles are bonded, that is, subjected to so-called sintering or melting and bonding, and become a unit sintered object 94 of a metal block to be formed at the position P11 ($x_{11}$, $y_{11}$). In the radiation of the lasers L1 and L2, a radiation amount is set in accordance with the conditions such as the material composition, volume, and the like of the dried unit material 93. After the set radiation amount is radiated to the unit material 93, the radiation stops.

As will be described below, the material supply process (S310), the drying process (S320), and the sintering process (S330) described above are repeated to form the partial fabricated object 201 of a first layer which is a first single layer in this example. In the partial fabricated object 201, the material supply process (S310), the drying process (S320), and the sintering process (S330) described above are repeated m times with the movement of the stage 20. The m-th unit sintered object 94 is formed at a coordinate position $P_{END}=P1m$ ($x_{1m}$, $y_{1m}$) of the stage 20 which is at an end of the partial fabricated object 201.

Figure 9A:
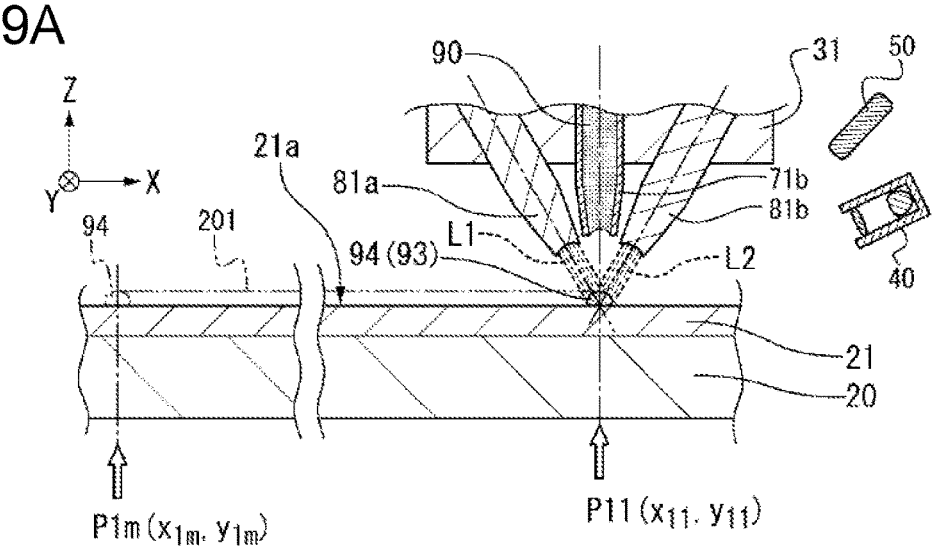
FIGS. 9A to 9C are partial sectional views illustrating a process in the three-dimensional forming method according to the third embodiment.
Figure 9B:
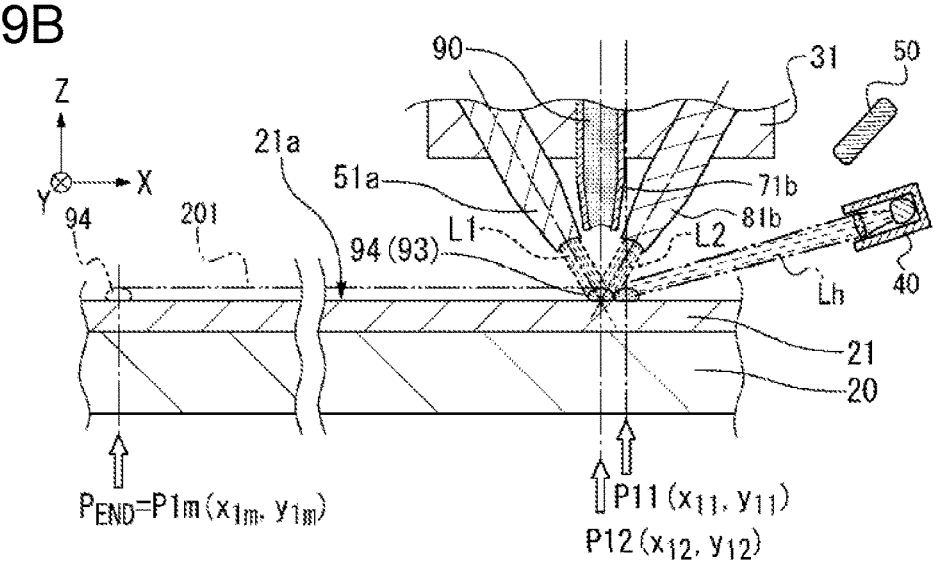

Accordingly, when the unit sintered object 94 is formed at the position P11 ($x_{11}$, $y_{11}$), a formation path confirmation process (S340) is performed to determine whether the material supply process (S310), the drying process (S320), and the sintering process (S330) are repeated by the number of repetitions m until the partial fabricated object 201 is formed, that is, the ejection nozzle 71b reaches the coordinate position $P_{END}=P1m$ ($x_{1m}$, $y_{1m}$) of the stage 20. When the processes are not repeated by the number of repetitions m in the formation path confirmation process (S340), that is, the ejection nozzle 71b does not reach the coordinate position $P_{END}=P1m$ ($x_{1m}$, $y_{1m}$) of the stage 20 and "NO" is determined, as illustrated in FIG. 9B, the process proceeds to the material supply process (S310) again. Then, the stage 20 is driven so that the ejection nozzle 71b faces a position P12 ($x_{12}$, $y_{12}$) which is a position at which the subsequent unit material 93 is formed. When the ejection nozzle 71b faces the position P12 ($x_{12}$, $y_{12}$), the material supply process (S310), the drying process (S320), and the sintering process (S330) are performed to form the unit sintered object 94 at the position P12 ($x_{12}$, $y_{12}$).

Figure 9C:
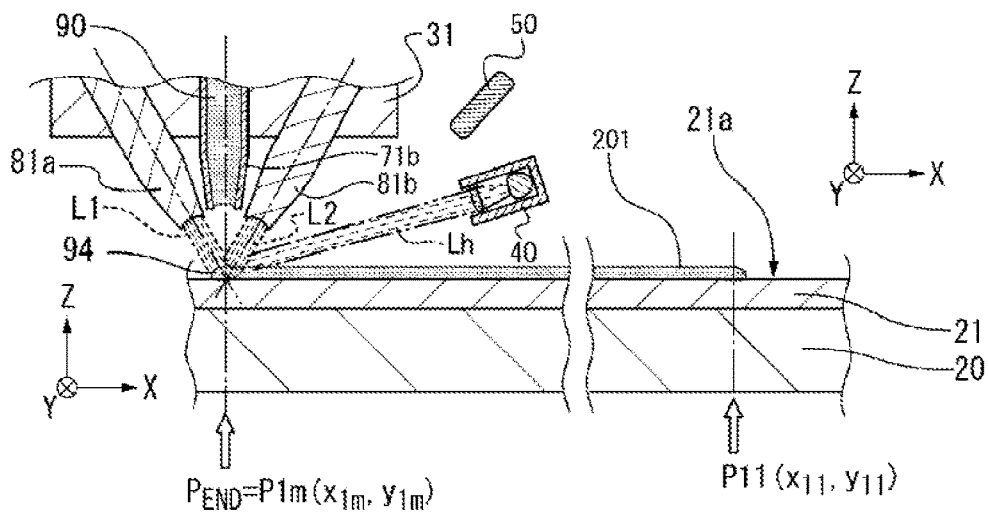

As illustrated in FIG. 9C, the material supply process (S310), the drying process (S320), and the sintering process (S330) are repeated m times so that the partial fabricated object 201 is formed. When the coordinate position of the stage 20 which the ejection nozzle 71b faces by the number of repetitions m is confirmed to be coordinate position $P_{END}=P1m$ ($x_{1m}$, $y_{1m}$) and "YES" is determined, the single forming process (S300) ends.

Stack Number Comparison Process

When the partial fabricated object 201 of the first layer, which is the first single layer formed through the single layer forming process (S300), the process proceeds to a stack number comparison process (S400) of comparing with the fabrication data obtained through the three-dimensional fabrication data acquisition process (S100). In the stack number comparison process (S400), the number of stacked layers N of the partial fabricated objects included in the three-dimensional fabricated object 200 is compared to the number of stacked layers n of the partial fabricated objects stacked up to the single layer forming process (S300) immediately before the stack number comparison process (S400).

When n=N is determined in the stack number comparison process (S400), it is determined that the forming of the three-dimensional fabricated object 200 is completed and the three-dimensional forming ends. Conversely, when n<N is determined, the process is performed again from the stacking start process (S200).

Figure 10A:
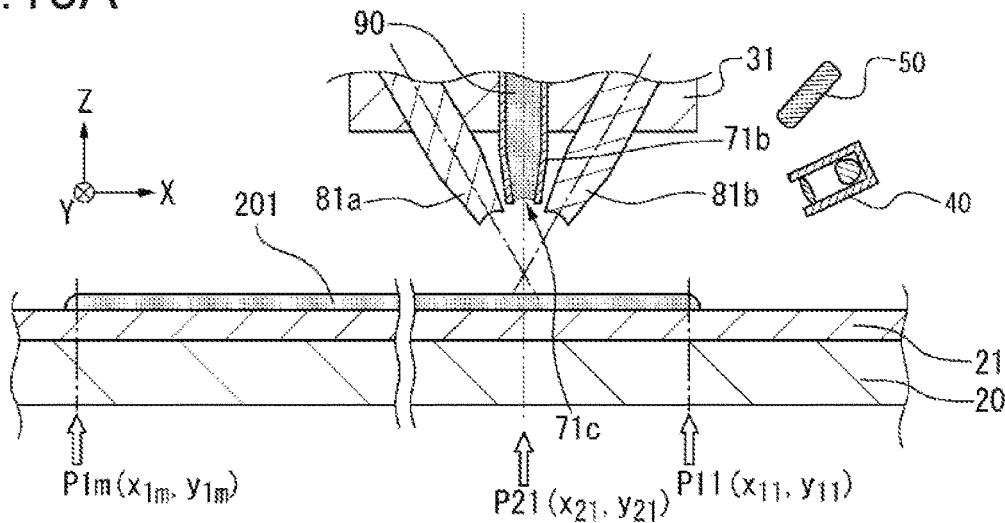
FIGS. 10A to 10C are partial sectional views illustrating a process in the three-dimensional forming method according to the third embodiment.

FIG. 10A is a sectional view illustrating a method of forming the partial fabricated object 202 of a second layer which is a second single layer. As illustrated in FIG. 10A, the stacking start process (S200) is first performed again. At this time, the stage 20 is moved in the Z axis direction to be separated from the ejection port 71c and the laser radiation units 81a and 81b by an interval corresponding to a thickness h1 of the partial fabricated object 201 of the first layer. Further, the stage 20 including the sample plate 21 is moved so that the flying material part 91 (see FIGS. 2A and 2B; the flying material part Mf illustrated in FIGS. 2A and 2B) which is the sinterable material with the liquid droplet form ejected from the ejection port 71c of the ejection nozzle 71b of the material ejection unit 71 is landed to a coordinate position P21 ($x_{21}$, $y_{21}$) of the stage 20 which is a fabrication start point of the second layer based on the three-dimensional fabrication data, the second layer of the three-dimensional fabricated object starts to be formed, and the process proceeds to the stacking start process for the second layer (S200).

Figure 10B:
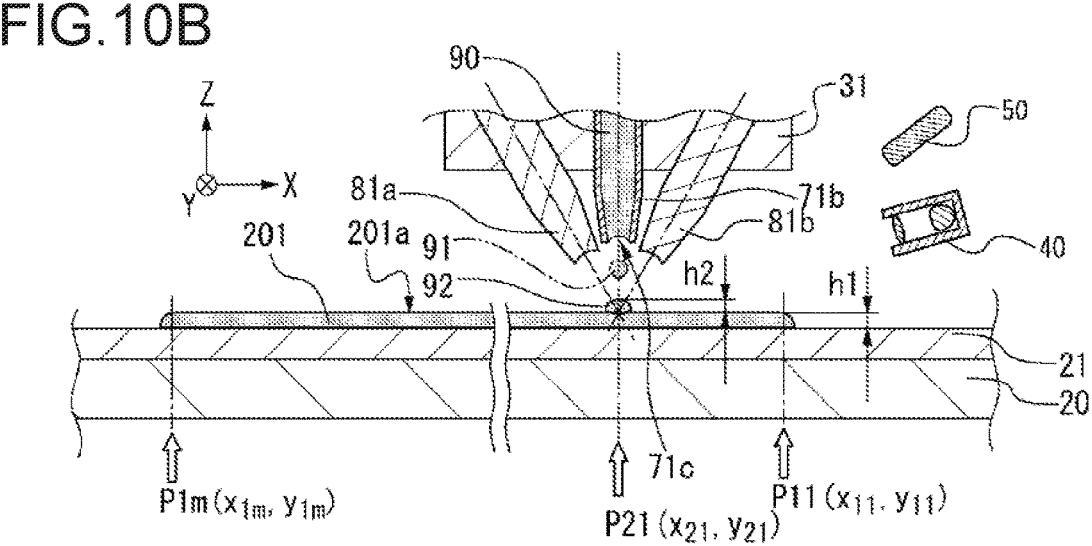

Thereafter, as in FIGS. 8A to 9C, illustrating the forming of the partial fabricated object 201 of the first layer described above, the single layer forming process (S300) is performed. First, in the material supply process (S310), as illustrated in FIG. 10B, the sample plate 21 is moved with movement of the stage 20 so that the ejection nozzle 71b held in the head 31 faces the position P21 ($x_{21}$, $y_{21}$) which is a predetermined position in the stacking start process (S200). Then, the supply material 90 which is the sinterable material is ejected as the flying material part 91 with the liquid droplet form from the ejection port 71c of the ejection nozzle 71b to the upper surface 201a of the partial fabricated object 201 of the first layer.

The flying material part 91 is landed to the upper surface 201a of the partial fabricated object 201 and is disposed as the unit material 92 with the liquid droplet form (hereinafter referred to as the unit material 92) on the upper surface 201a. Then, the material supply process (S310) ends at the position P21 ($x_{21}$, $y_{21}$), the unit material 92 with a height h2 (so-called buildup amount) is formed on the upper surface 201a of the partial fabricated object 201.

Figure 10C:
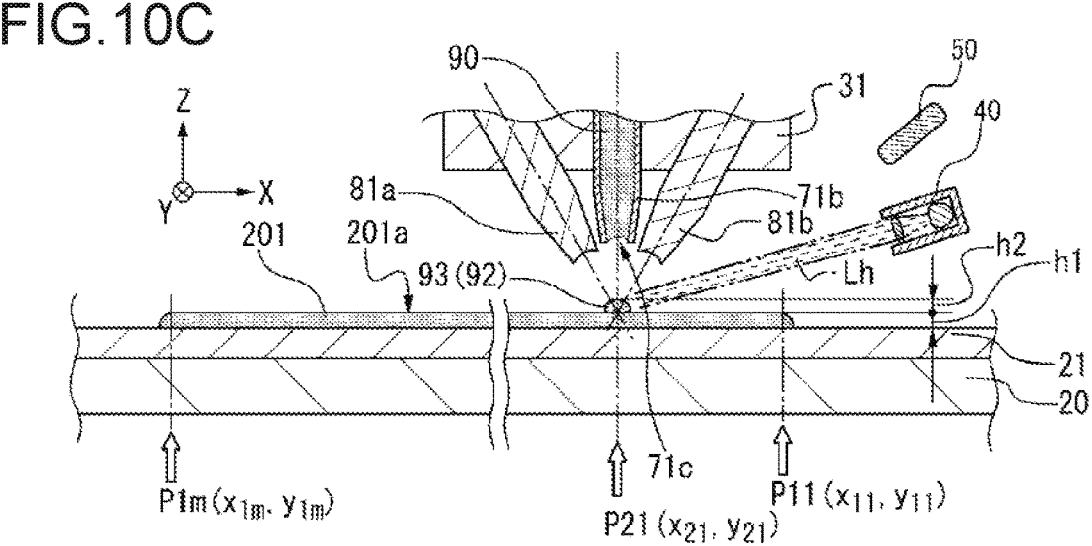

When the unit material 92 is disposed on the upper surface 201a of the partial fabricated object 201, the process proceeds to the drying process (S320). In the drying process (S320), as illustrated in FIG. 10C, the heat ray Lh is radiated from the lamp 40 to the unit material 92 landed to the upper surface 201a of the partial fabricated object 201 in the material supply process (S310). At this time, the temperature of the upper surface 201a of the partial fabricated object 201 is measured by the thermometer 50, the power to be input to the lamp 40 is controlled, and energy of the heat ray Lh with a predetermined dry temperature is radiated to the unit material 92. Then, a unit material 93 after the drying in which the liquid components are transpired and dried is formed. Accordingly, the unit material 93 after the drying has worse fluidity than the unit material 92 before the drying, spreading along the upper surface 201a is suppressed, and thus a height h2 (so-called buildup amount) from the upper surface 201a of the partial fabricated object 201 can be ensured for the unit material 93.

Figure 11A:
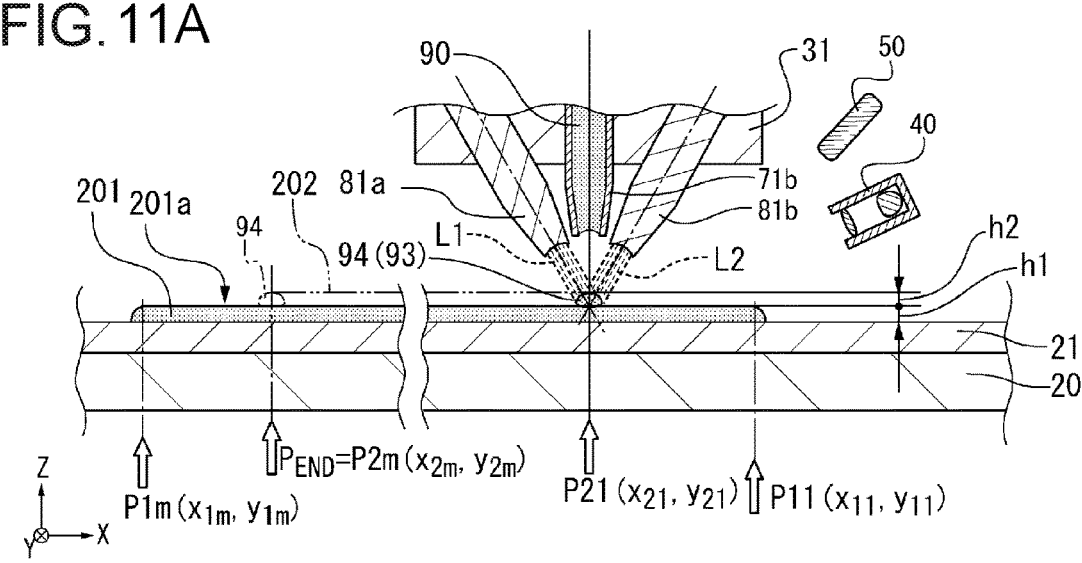
FIGS. 11A to 11C are partial sectional views illustrating a process in the three-dimensional forming method according to the third embodiment.

When the unit material 93 is disposed on the upper surface 201a through the drying process (S320), the sintering process (S330) starts. In the sintering process (S330), as illustrated in FIG. 11A, the lasers L1 and L2 are radiated from the laser radiation units 81a and 81b to the dried unit material 93. The unit material 93 is sintered by the energy (heat) of the lasers L1 and L2, so that the unit sintered object 94 is formed. The material supply process (S310), the drying process (S320), and the sintering process (S330) described above are repeated to form the partial fabricated object 202 of a second layer on the upper surface 201a of the partial fabricated object 201 of the first layer. In the partial fabricated object 202, the material supply process (S310), the drying process (S320), and the sintering process (S330) described above are repeated m times with the movement of the stage 20. The m-th unit sintered object 94 is formed at a coordinate position $P_{END}=P2m$ ($x_{2m}$, $y_{2m}$) of the stage 20 which is at an end of the partial fabricated object 202.

Figure 11B:
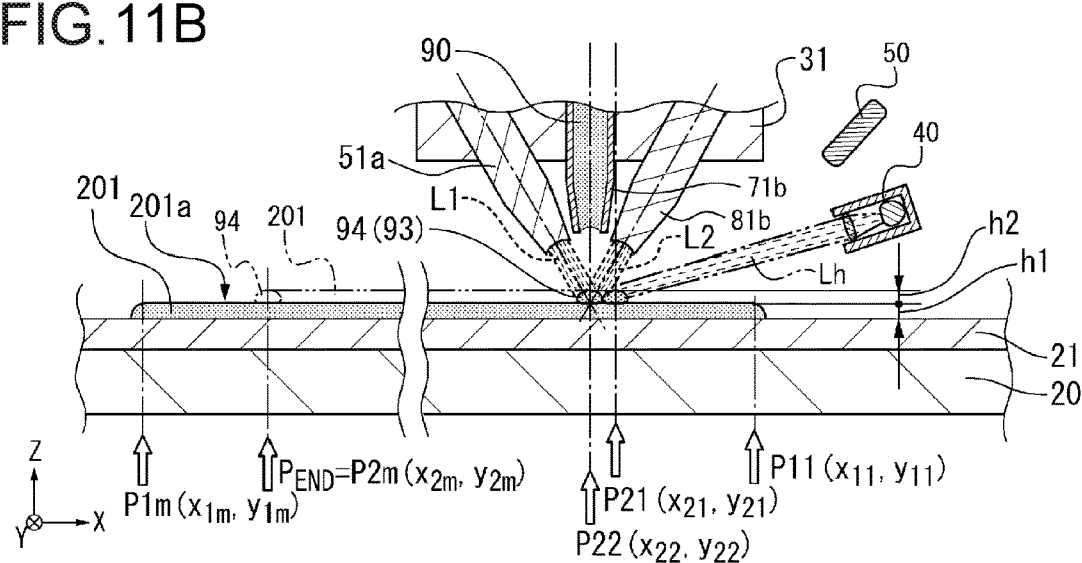

Accordingly, when the unit sintered object 94 is formed at the position P21 ($x_{21}$, $y_{21}$), the formation path confirmation process (S340) is performed to determine whether the material supply process (S310), the drying process (S220), and the sintering process (S330) are repeated by the number of repetitions m until the partial fabricated object 202 of the second layer is formed, that is, the ejection nozzle 71b reaches the coordinate position $P_{END}=P2m$ ($x_{2m}$, $y_{2m}$) of the stage 20. When the processes are not repeated by the number of repetitions min the formation path confirmation process (S340), that is, the ejection nozzle 71b does not reach the coordinate position $P_{END}=P2m$ ($x_{2m}$, $y_{2m}$) of the stage 20 and "NO" is determined, as illustrated in FIG. 11B, the process proceeds to the material supply process (S310) again. Then, the stage 20 is driven so that the ejection nozzle 71b faces a position P22 ($x_{22}$, $y_{22}$) which is a position at which the subsequent unit material 92 is formed. When the ejection nozzle 71b faces the position P22 ($x_{22}$, $y_{22}$), the material supply process (S310), the drying process (S320), and the sintering process (S330) are performed to form the unit sintered object 94 at the position P22 ($x_{22}$, $y_{22}$).

Figure 11C:
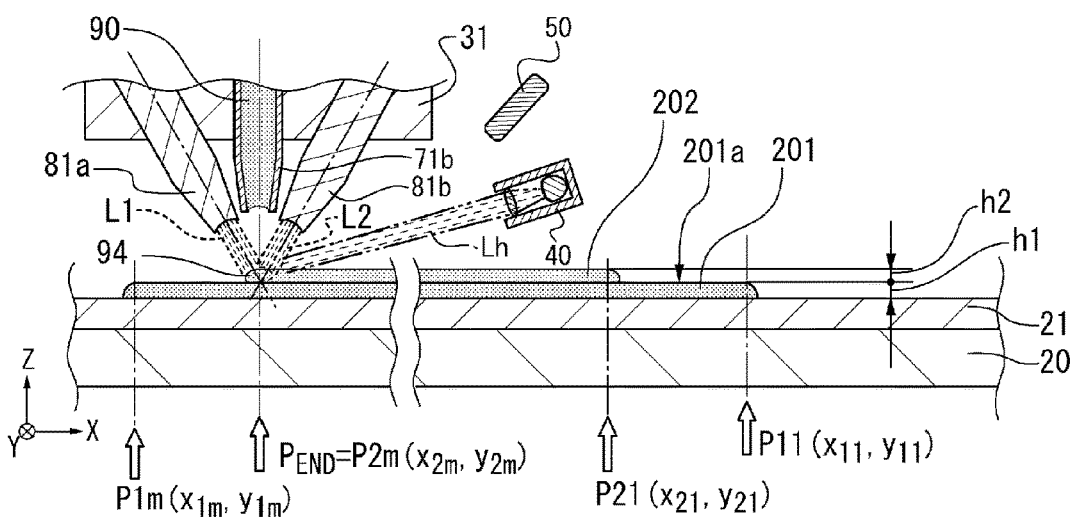

As illustrated in FIG. 11C, the material supply process (S310), the drying process (S320), and the sintering process (S330) are repeated m times so that the partial fabricated object 202 of the second layer is formed. When the coordinate position of the stage 20 which the ejection nozzle 71b faces by the number of repetitions m is confirmed to be a coordinate position $P_{END}=P2m$ ($x_{2m}$, $y_{2m}$) and "YES" is determined, the single forming process for the second layer (S300) ends.

The process proceeds to the stack number comparison process again (S400). Then, until n=N, the stacking start process (S200) and the single layer forming process (S300) are repeated to form the three-dimensional fabricated object using the three-dimensional forming apparatus 1000 according to the first embodiment. The stacking start process (S200) and the single layer forming process (S300) of forming the partial fabricated object 202 of the second layer, which is the second single layer on the partial fabricated object 201 of the first layer, which is the first single layer are referred to as a stacking process in the application examples. The stacking process is repeated until n=N is determined in the stack number comparison process (S400).

Fourth Embodiment

A three-dimensional forming method according to a fourth embodiment will be described. In the three-dimensional forming method according to the above-described third embodiment, when the three-dimensional fabricated object has an overhang, there is no partial fabricated object of the lower layer to which the flying material part 91 is to be landed in the overhang, and thus the unit material 92 is not formed in the material supply process (S310) of the above-described single layer forming process (S300) (see FIG. 10B). Even when the unit material 92 is landed to the position P22 ($x_{22}$, $y_{22}$) so that the unit material 92 overlaps to be linked to the unit sintered object 94 formed at the position P21 ($x_{21}$, $y_{21}$) illustrated in FIG. 11B, there is a concern of the unit material being deformed and hanging down in the gravity direction in a case in which there is no partial fabricated object of the lower layer. That is, the unit material 92 before the drying and the sintering is a soft material in a slurry state (or a paste form) obtained by kneading an elementary powder of a metal which is the raw material, for example, an alloy of stainless steel and titanium, or a mixed powder of stainless steel and copper (Cu) which are difficult to alloy, an alloy of stainless and titanium, or a titanium alloy and cobalt (Co) or chrome (Cr) with a solvent and a thickener.

Accordingly, a method of forming a three-dimensional fabricated object without deforming an overhang by the three-dimensional forming method according to the fourth embodiment will be described. The same reference numerals are given to the same processes as those of the three-dimensional forming method according to the third embodiment, and the description thereof will be omitted. To facilitate the description, as illustrated in the external plan view of FIG. 12A and the sectional view of FIG. 12B taken along the line A-A' illustrated in FIG. 12A, a three-dimensional fabricated object 300 with a simple shape will be exemplified to describe the three-dimensional forming method according to the fourth embodiment, but the invention is not limited to this shape. The invention can be applied when a fabricated object has a so-called overhang.

Figure 12A:
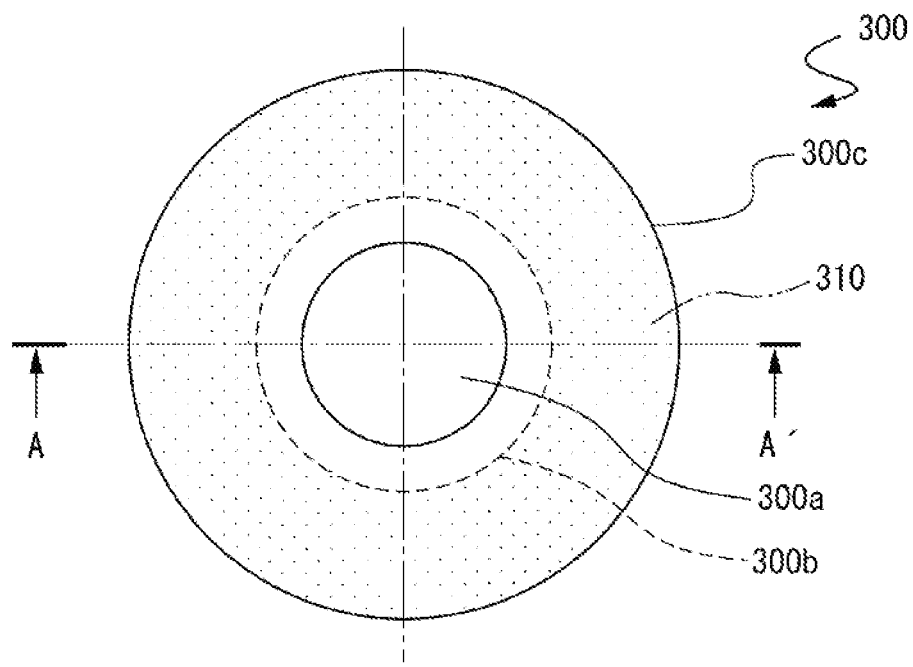
FIG. 12A is an external plan view illustrating a three-dimensional fabricated object formed by a three-dimensional forming method according to a fourth embodiment and FIG. 12B is a sectional view taken along the line A-A' illustrated in FIG. 12A.
Figure 12B:
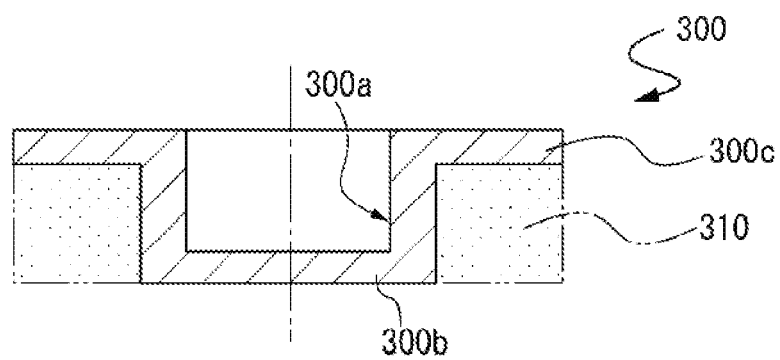

As illustrated in FIGS. 12A and 12B, the three-dimensional fabricated object 300 includes a flange portion 300c which is an overhang extending to the outer side of a base portion 300b in a concave opening-side end of the columnar base portion 300b including a concave portion 300a. To form the three-dimensional fabricated object 300 based on the three-dimensional forming method according to the fourth embodiment, fabrication data to form the columnar support portions 310 that reach the bottom portion of the base portion 300b and the flange portion 300c, in the illustrated lower direction, is added to three-dimensional fabrication data of the three-dimensional fabricated object 300. The columnar support portions 310 are removed in the forming process.

Figure 13:
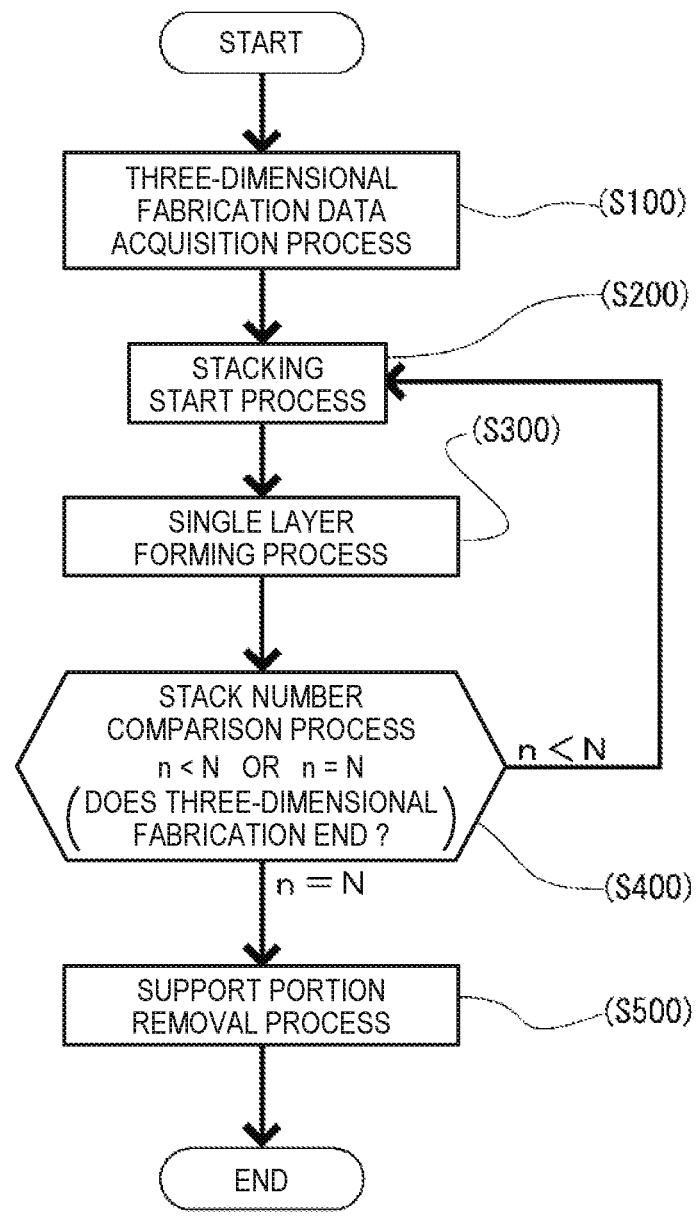
FIG. 13 is a flowchart illustrating a three-dimensional forming method according to the fourth embodiment.

FIG. 13 is a flowchart illustrating a method of forming the three-dimensional fabricated object 300 illustrated in FIGS. 12A and 12B. FIGS. 14A to 14D illustrate a method of forming the three-dimensional fabricated object 300 in the flowchart illustrated in FIG. 13, and partial sectional views and external plan views are illustrated on the left side and the right side of the drawings, respectively. In the three-dimensional fabricated object 300 according to the embodiment, an example in which four layers are stacked and formed will be described, but the invention is not limited thereto.

Figure 14A:
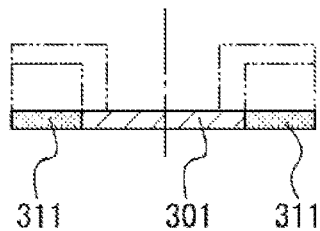
FIGS. 14A to 14D are sectional views and plan views illustrating the three-dimensional forming method according to the fourth embodiment.
Figure 14A:
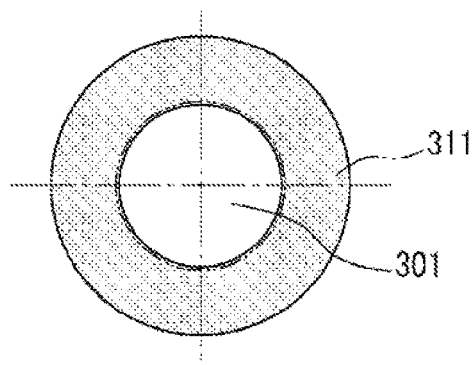

As illustrated in FIG. 14A, first, a partial fabricated object 301 which is a first layer formed on the sample plate 21 (not illustrated) is formed by the three-dimensional forming method according to the third embodiment. In the process of forming the partial fabricated object 301, partial support portions 311 of the first layer are also formed. The processes up to the drying process (S320) of the single layer forming process (S300) described with reference to FIGS. 8A to 9C are performed on the partial support portions 311, and the sintering process (S330) is not performed and the single layer forming process (S300) is performed with the dried unit material 93 remaining, that is, unsintered or unmelted.

Figure 14B:
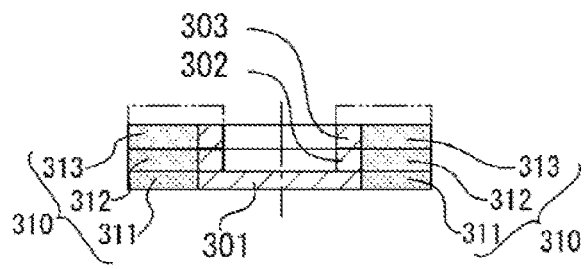
Figure 14B:
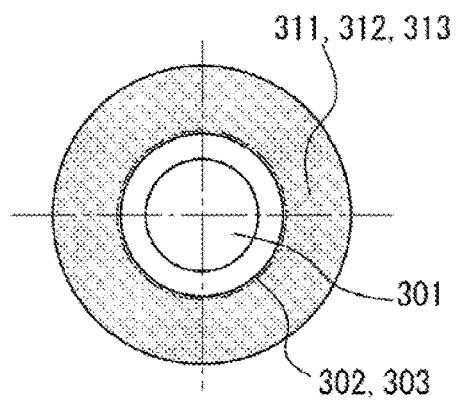

Subsequently, the single layer forming process (S300) is repeated to form partial fabricated objects 302 and 303 which are second and third layers, as illustrated in FIG. 14B. Then, in a process of forming the partial fabricated objects 302 and 303, partial support portions 312 and 313 of the second and third layers are also formed. As in the partial support portion 311, the drying process (S320) of the single layer forming process (S300) is performed and the sintering process (S330) is not performed on the partial support portions 312 and 313, and the single layer forming process (S300) is performed with the aggregate of the dried unit material 93 remaining, that is, unsintered or unmelted, so that the support portions 310 are formed by the partial support portions 311, 312, and 313.

Figure 14C:
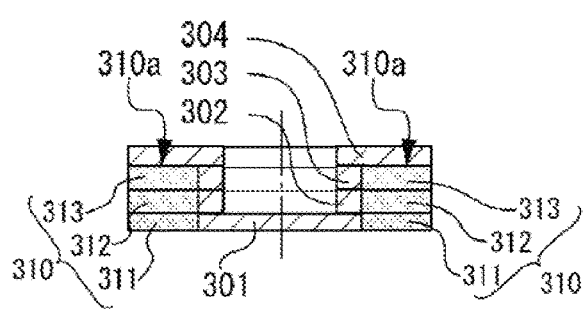
Figure 14C:
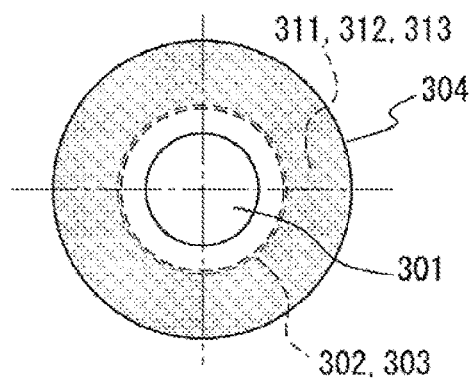

Next, as illustrated in FIG. 14C, a partial fabricated object 304 of a fourth layer formed in the flange portion 300c is formed. The partial fabricated object 304 is formed to be supported by ends 310a of the support portions 310 formed by the partial support portions 311, 312, and 313. By forming the partial fabricated object 304 in this way, the ends 310a are formed as surfaces to which the unit material 92 (see FIGS. 8A to 8C) is landed, so that the partial fabricated object 304 of the fourth layer which becomes the flange portion 300c can be formed accurately.

Figure 14D:
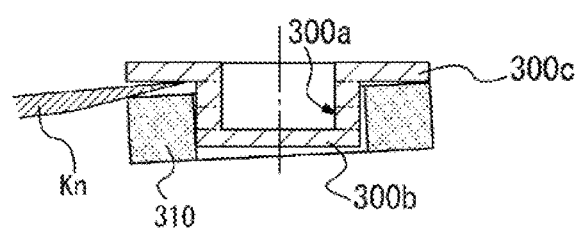
Figure 14D:
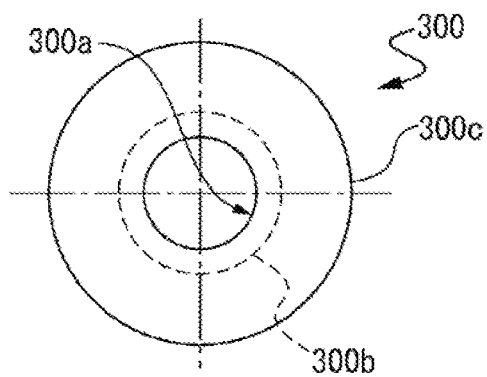

Then, as illustrated in FIG. 14D, when the three-dimensional fabricated object 300 is fabricated, the support portions 310 are removed from the three-dimensional fabricated object 300 in the support portion removal process (S500). Since the support portions 310 are formed of an unbaked material, the support portions 310 can be physically cut by, for example, a sharp-edged tool Kn, which is a removal mechanism for the support portions 310 in a support portion removal process (S500), as illustrated in FIG. 14D. Alternatively, the three-dimensional fabricated object 300 may be removed by performing immersing in a solvent and dissolving the binder included in the material.

As described above, when the three-dimensional fabricated object 300 including the flange portion 300c which is the overhang is formed, it is possible to prevent the flange portion 300c from being deformed in the gravity direction by forming the support portions 310 supporting the flange portion 300c in conjunction with the forming of the three-dimensional fabricated object 300. The support portions 310 illustrated in FIGS. 12A and 12D are not limited to the form in which the illustrated flange portion 300c is supported (sustained) on the entire surface, but the shapes, sizes, and the like of the support portions are appropriately set according to the shape of the fabricated object, a material composition, or the like.

The specific configurations in the embodiments of the invention can be appropriately changed to other devices or methods within the scope of the invention in which the object of the invention can be achieved.

What is claimed is:

1. A three-dimensional forming apparatus comprising:
   a stage;
   a material supply mechanism that supplies a sinterable material, in which metal powder and a binder are contained therein, to the stage;
   an energy radiation mechanism that supplies energy capable of sintering the sinterable material; and
   a driving mechanism that is able to move the material supply mechanism and the energy radiation mechanism relative to the stage,
   wherein the material supply mechanism includes at least one material ejection unit supplying a predetermined amount of the sinterable material to the stage,
   wherein the energy radiation mechanism includes a first energy radiation unit and a second energy radiation unit each outputting the energy toward the sinterable material ejected onto the stage, an angle of incidence of the energy supplied from the first energy radiation unit to the stage or the sinterable material ejected onto the stage being different to an angle of incidence of the energy supplied from the second energy radiation unit, and
   wherein the at least one material ejection unit, the first energy radiation unit, and the second energy radiation unit are held in one head.

2. The three-dimensional forming apparatus according to claim 1,
   wherein the energy radiation mechanism radiates the energy in a direction intersecting the gravity direction.

3. The three-dimensional forming apparatus according to claim 1,
   wherein the at least one material ejection unit ejects the sinterable material in a liquid droplet form.

4. The three-dimensional forming apparatus according to claim 1,
   wherein the material supply mechanism includes a plurality of material supply units supplying the sinterable material up to the at least one material ejection unit including at least a material ejection port facing the stage, and
   wherein the plurality of the material supply units are included and supply at least two kinds of the sinterable materials with different compositions.

5. The three-dimensional forming apparatus according to claim 1,
   wherein the energy radiation mechanism is a laser radiation mechanism.

* * * * *